(12) United States Patent
Matono

(10) Patent No.: US 7,583,472 B2
(45) Date of Patent: Sep. 1, 2009

(54) THIN FILM MAGNETIC HEAD, METHOD OF MANUFACTURING THE SAME, AND MAGNETIC RECORDING APPARATUS

(75) Inventor: Naoto Matono, Saku (JP)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 201 days.

(21) Appl. No.: 10/926,895

(22) Filed: Aug. 25, 2004

(65) Prior Publication Data

US 2005/0105215 A1 May 19, 2005

(30) Foreign Application Priority Data

Sep. 19, 2003 (JP) ............................ 2003-328632

(51) Int. Cl.
*G11B 5/127* (2006.01)
*G11B 5/147* (2006.01)
(52) U.S. Cl. .................. 360/125.1; 360/125.11; 360/125.14; 360/125.15
(58) Field of Classification Search ........... 360/126, 360/125, 125.01, 125.1, 125.11, 125.2, 125.21, 360/125.47, 125.48, 125.52, 125.53, 125.6, 360/125.61, 125.65, 125.66, 125.14, 125.15
See application file for complete search history.

(56) References Cited

U.S. PATENT DOCUMENTS 7,142,391 B2 * 11/2006 Ohtomo et al. ............. 360/126

* cited by examiner

*Primary Examiner*—Julie Anne Watko
(74) *Attorney, Agent, or Firm*—Kenyon & Kenyon LLP

(57) ABSTRACT

The present invention provides a thin film magnetic head capable of suppressing unintentional wiring to a neighboring track and preventing information recorded on a recording medium from being erased. A main magnetic pole layer is constructed so that height of a widened end surface in a lower main magnetic pole layer specifying a wide portion is smaller than height of an exposed surface in an upper main magnetic pole layer (front end portion) specifying a uniform width portion. Since the area of the widened end surface is narrowed with respect to the area of the exposed surface, even if an amount of magnetic flux flowing in the lower main magnetic pole layer increases at the time of recording information, as compared with the case where the height of the widened end surface is equal to the height of the exposed surface, unintentional emission of the magnetic flux flowing in the lower main magnetic pole layer from the widened end surface not via the upper main magnetic pole layer (front end portion) toward the recording medium is suppressed.

4 Claims, 17 Drawing Sheets

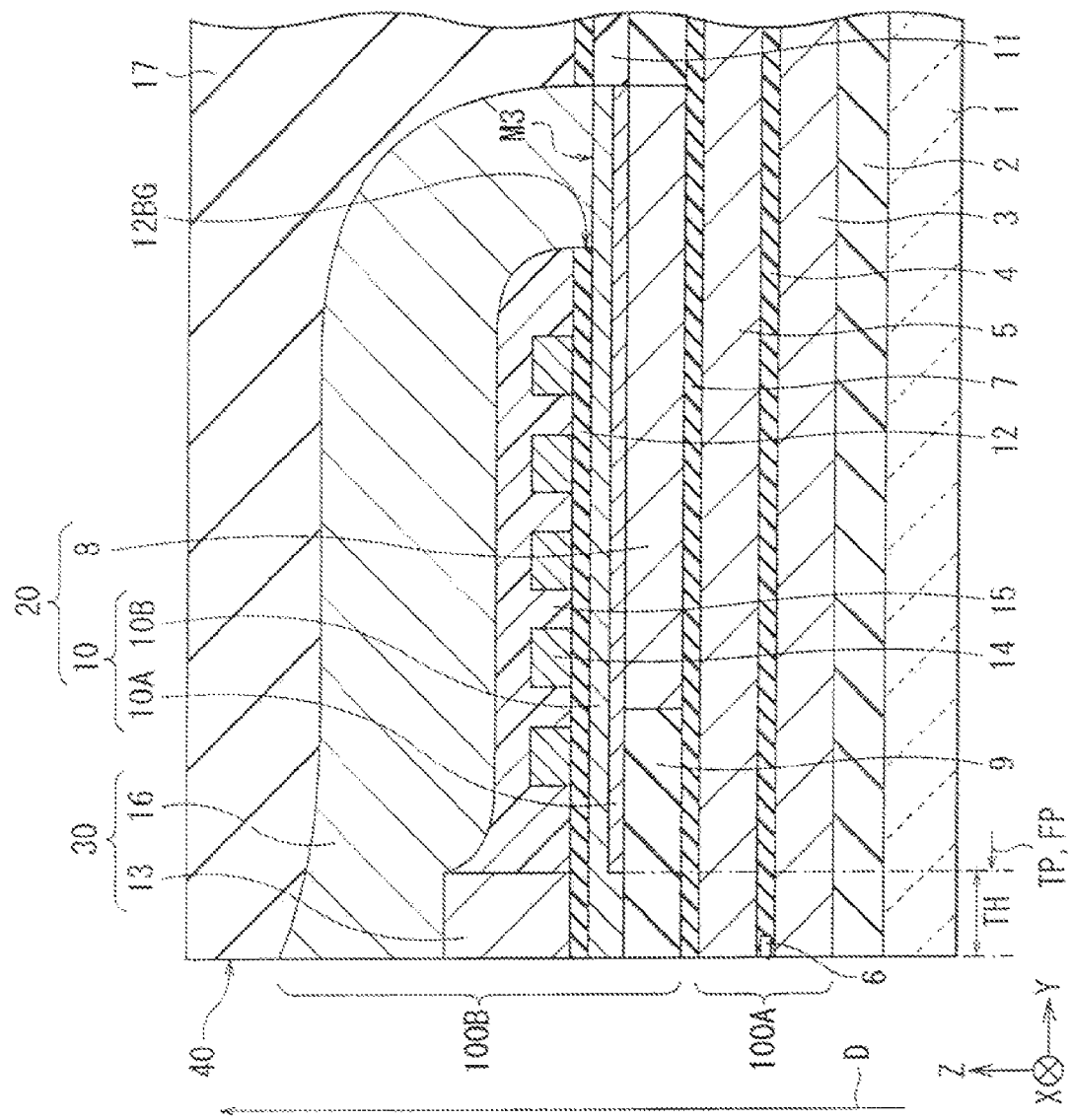
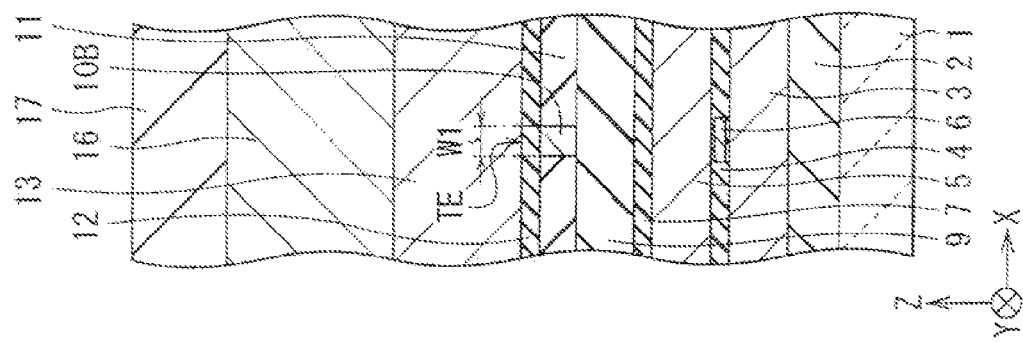
FIG. 1B
FIG. 1A

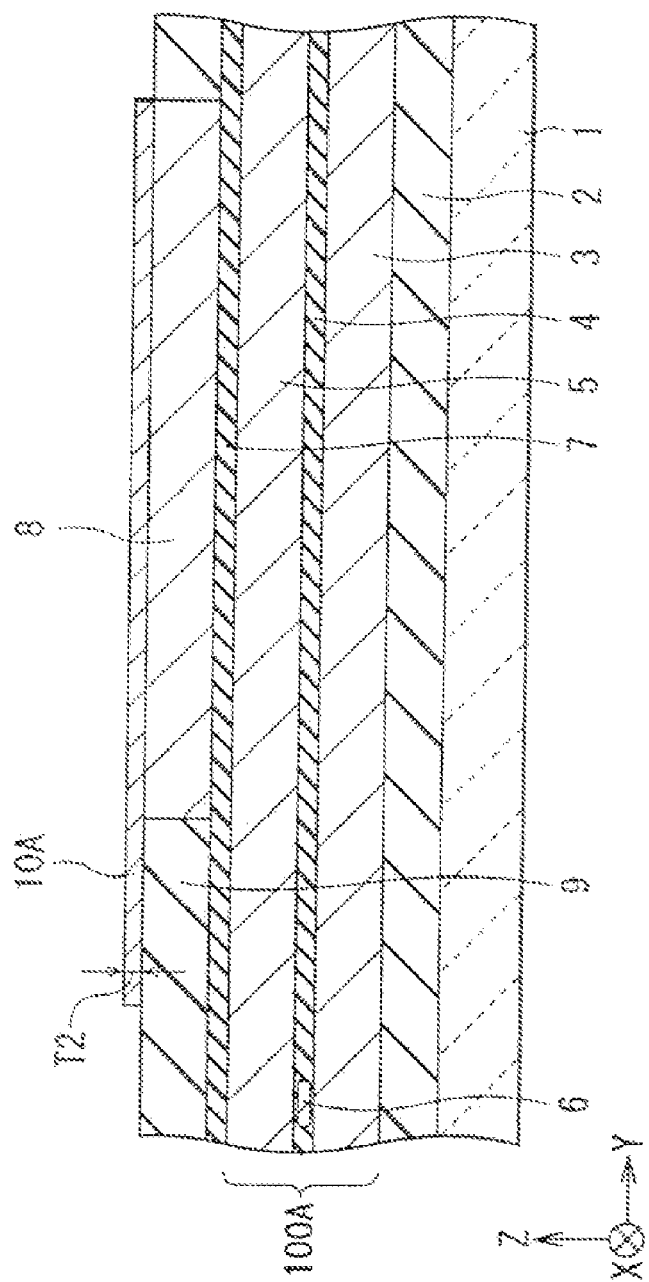
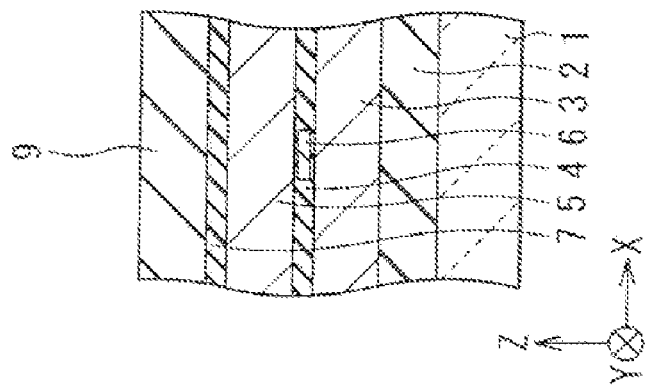
FIG. 4B
FIG. 4A

THIN FILM MAGNETIC HEAD, METHOD OF MANUFACTURING THE SAME, AND MAGNETIC RECORDING APPARATUS

The present application claims benefit of the Japanese Patent Application Number 2003-328632, filed on Sep. 19, 2003.

BACKGROUND OF THE INVENTION

1. Field of the Invention

The present invention relates to a thin film magnetic head having at least an inductive magnetic transducer for recording, a method of manufacturing the same, and a magnetic recording apparatus in which the thin film magnetic head is mounted.

2. Description of the Related Art

In recent years, in association with improvement in areal density of a magnetic recording medium (for example, a hard disk), improvement in performance of a thin film magnetic head to be mounted on a magnetic recording apparatus (for example, a hard disk drive) is demanded. Known recording methods of a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in areal density is considered, it is assumed that, in place of the longitudinal recording method, the perpendicular recording method will be regarded as a promising method in future for the following reason. The perpendicular recording method has advantages such that high linear recording density can be assured and a recorded hard disk is not easily influenced by thermal decay.

A thin film magnetic head of the perpendicular recording method has a thin film coil for generating a magnetic flux and a magnetic pole layer extended rearward from the air bearing surface and emitting the magnetic flux generated by the thin film coil toward a hard disk. The magnetic pole layer includes, for example, a uniform width portion extending rearward from the air bearing surface and having a uniform width which specifies recording track width of a hard disk, and a wide portion coupled to the rear end of the uniform width portion and having width larger than the width of the uniform width portion. As a thin film magnetic head of this kind, for example, a thin film magnetic head having a configuration that a magnetic pole layer is formed partially over a yoke layer and is magnetically coupled to the yoke layer is known (refer to, for example, Japanese Unexamined Patent Application No. 2002-197611). In the thin film magnetic head of this kind, when a magnetic flux generated by the thin film coil is emitted from the uniform width portion in the magnetic pole layer to the outside, a hard disk is magnetized by a magnetic field (perpendicular magnetic field) generated on the basis of the magnetic flux, so that information is magnetically recorded on the hard disk.

To stably assure recording performance of the thin film magnetic head, for example, it is necessary to suppress unintentional writing to a neighboring track in a recording operation. The "unintentional writing to a neighboring track" is a phenomenon such that at the time of recording information onto a track to be recorded on a hard disk, a magnetic flux is emitted from the uniform width portion of the magnetic pole layer toward the track to be recorded. In addition, an unnecessary magnetic flux is unintentionally emitted to a neighboring track (a track adjacent to the track to be recorded) from the wide portion without passing through the uniform width portion. Due to this, information already recorded on the neighboring track is unintentionally overwritten. In short, the phenomenon is a problem that recorded information is erased. From the viewpoint of protection of information recorded on a hard disk, naturally, erasure of information caused by unintentional writing to a neighboring track has to be prevented as much as possible. However, the conventional thin film magnetic head has a problem such that unintentional writing to a neighboring track cannot be sufficiently suppressed depending on a structural factor of the magnetic pole layer and there is the possibility that erasure of information recorded on a hard disk is not sufficiently prevented. To spread the thin film magnetic head of the perpendicular recording method, it is urgently needed to establish a technique capable of preventing information from being erased by suppressing unintentional writing to a neighboring track. In particular, when mass productivity of the thin film magnetic head is considered, it is also important to establish a manufacturing technique capable of manufacturing a thin film magnetic head easily and stably.

SUMMARY OF THE INVENTION

The present invention has been achieved in consideration of such problems and its first object is to provide a thin film magnetic head capable of preventing information recorded on a recording medium from being erased by suppressing unintentional writing to a neighboring track.

A second object of the invention is to provide a thin film magnetic head manufacturing method capable of stably and easily manufacturing a thin film magnetic head of the invention.

A third object of the invention is to provide a magnetic recording apparatus in which a thin film magnetic head of the invention is mounted.

A thin film magnetic head according to the invention comprises: a thin film coil for generating a magnetic flux; and a magnetic pole layer which extends rearward from a recording-medium-facing surface facing a recording medium traveling in a medium travel direction and emits the magnetic flux generated by the thin film coil toward the recording medium. The magnetic pole layer includes: a uniform width portion having uniform width that specifies recording track width of the recording medium, extending from the recording-medium-facing surface, and including an exposed surface exposed on the recording-medium-facing surface; and a wide portion coupled to the rear end of the uniform width portion, extending with width larger than the uniform width, and including widened end surfaces along the increased width, and height H2 of the widened end surface in the wide portion is smaller than height H1 of the exposed surface in the uniform width portion (H2<H1).

Since the height H2 of the widened end surface is smaller than the height H1 of the exposed surface in the thin film magnetic head of the invention, as compared with the case where the height H2 of the widened end surface is equal to the height H1 of the exposed surface, the widened end surface as a port of unintentional emission of a magnetic flux is narrowed. With the configuration, at the time of recording information, emission of the magnetic flux received in the wide portion from the widened end surface toward a recording medium without passing through the uniform width portion is suppressed.

A method of manufacturing a thin film magnetic head according to the invention comprising: a thin film coil for generating a magnetic flux; and a magnetic pole layer which extends rearward from a recording-medium-facing surface facing a recording medium traveling in a medium travel direction and emits the magnetic flux generated by the thin film coil toward the recording medium, comprises a step of forming the magnetic pole layer so as to include: a uniform width portion having uniform width that specifies recording track width of the recording medium, extending from the recording-medium-facing surface, and including an exposed surface exposed on the recording-medium-facing surface; and a wide portion coupled to the rear end of the uniform width portion, extending with width larger than the uniform width, and including widened end surfaces along the increased width, and by forming the uniform portion and the wide portion in different processes, height H2 of the widened end surface in the wide portion is set to be smaller than height H1 of the exposed surface in the uniform width portion (H2<H1).

In the method of manufacturing the thin film magnetic head according to the invention, to form the magnetic pole layer having a characteristic configuration such that the height H2 of the widened end surface is smaller than the height H1 of the exposed surface, only existing manufacturing processes are used but new and complicated manufacturing processes are not used. Moreover, the magnetic pole layer having the characteristic configuration can be formed repetitively with high reproducibility by using only the existing manufacturing processes.

The invention also provides a magnetic recording apparatus on which a recording medium and a thin film magnetic head for magnetically recording information onto the recording medium are mounted. The thin film magnetic head comprises: a thin film coil for generating a magnetic flux; and a magnetic pole layer which extends rearward from a recording-medium-facing surface facing the recording medium and emits the magnetic flux generated by the thin film coil toward the recording medium. The magnetic pole layer includes: a uniform width portion having uniform width that specifies recording track width of the recording medium, extending from the recording-medium-facing surface, and including an exposed surface exposed on the recording-medium-facing surface; and a wide portion coupled to the rear end of the uniform width portion, extending with width larger than the uniform width, and including widened end surfaces along the increased width, and height H2 of the widened end surface in the wide portion is set to be smaller than height H1 of the exposed surface in the uniform width portion (H2<H1).

Since the thin film magnetic head according to the invention is mounted on the magnetic recording apparatus of the invention, at the time of recording information, unintentional emission of the magnetic flux received in the wide portion from the widened end surface not via the uniform width portion toward a recording medium is suppressed.

In the thin film magnetic head according to the invention, on the basis of the structural characteristic that the height H2 of the widened end surface in the wide portion is smaller than the height H1 of the exposed surface in the uniform width portion (H2<H1), at the time of recording information, emission of the magnetic flux received in the wide portion from the widened end surface toward a recording medium without passing through the uniform width portion is suppressed. Thus, unintentional writing to a neighboring track is suppressed and information recorded on a recording medium can be prevented from being erased.

By the method of manufacturing the thin film magnetic head of the invention, the magnetic pole layer can be repetitively formed with high reproducibility by using only existing manufacturing processes without using new and complicated manufacturing processes. Thus, the thin film magnetic head of the invention can be manufactured stably and easily.

Since the thin film magnetic head of the invention is mounted on the magnetic recording apparatus according to the invention, unintentional writing to a neighboring track is suppressed and information recorded on a recording medium can be prevented from being erased.

Other and further objects, features and advantages of the invention will appear more fully from the following description.

BRIEF DESCRIPTION OF THE DRAWINGS

FIGS. 1A and 1B are cross sections showing a sectional configuration of a thin film magnetic head according to an embodiment of the invention.

FIGS. 4A and 4B are cross sections for explaining one of processes of manufacturing the thin film magnetic head according to the embodiment of the invention.

DETAILED DESCRIPTION OF THE PREFERRED EMBODIMENTS

Embodiments of the invention will now be described in detail hereinbelow with reference to the drawings.

Figure 2:
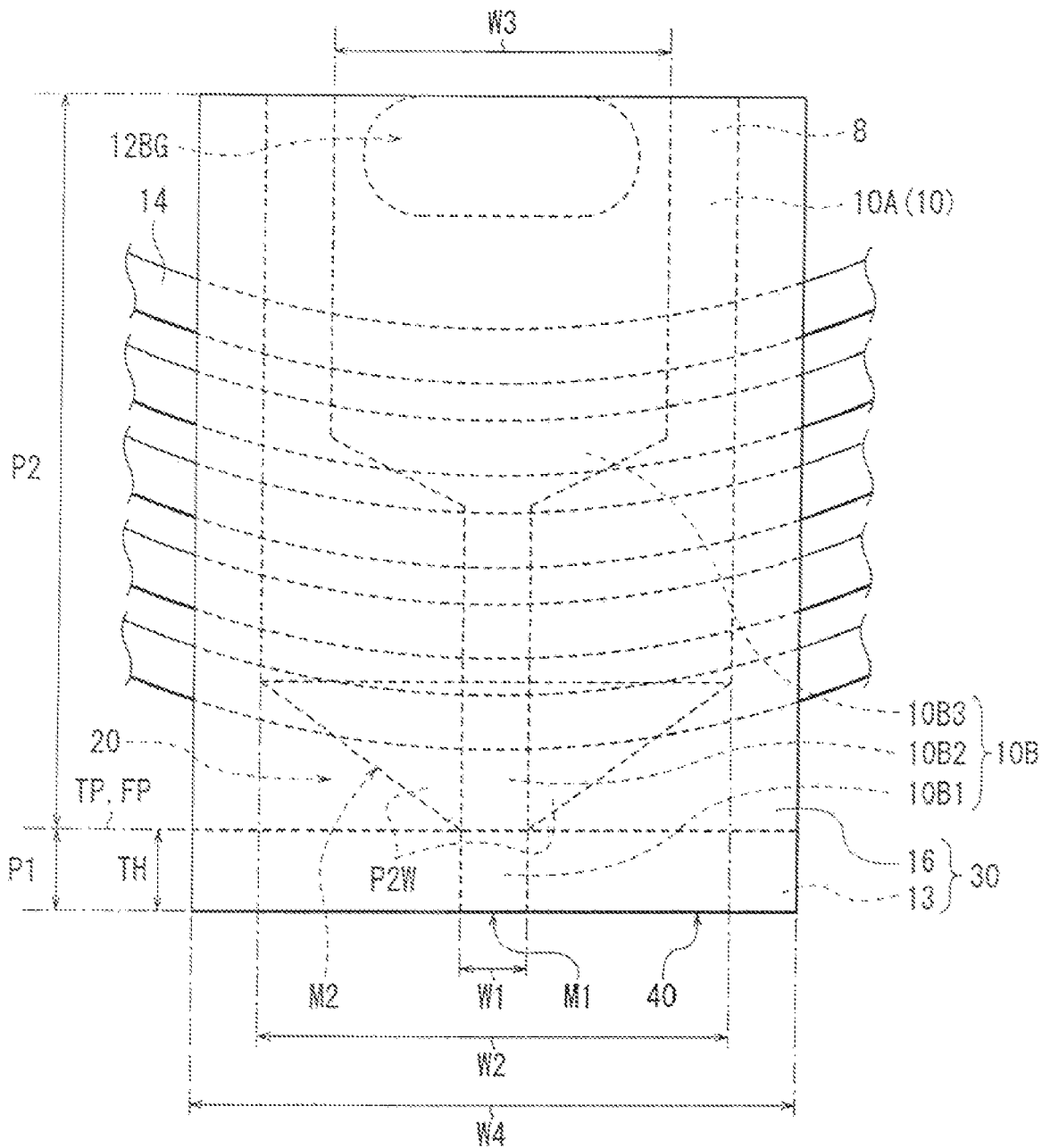
FIG. 2 is a plan view showing the configuration of a main portion of the thin film magnetic head illustrated in FIGS. 1A and 1B.
Figure 3:
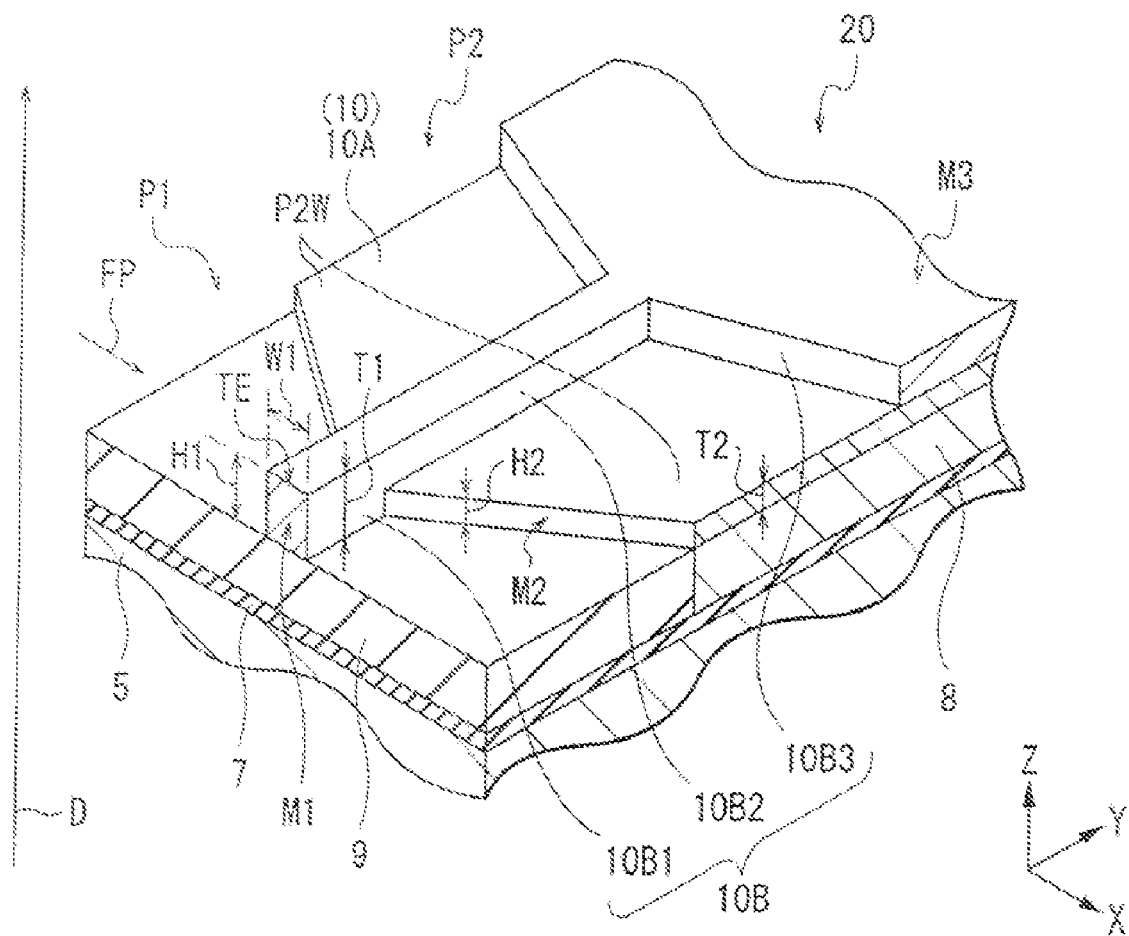
FIG. 3 is a perspective view showing the configuration of a main portion of the thin film magnetic head illustrated in FIGS. 1A and 1B.

First, the configuration of a thin film magnetic head according to an embodiment of the invention will be described with reference to FIGS. 1A and 1B to FIG. 3. FIGS. 1A and 1B show a sectional configuration of a thin film magnetic head. FIG. 1A shows a section parallel to an air bearing surface (section along the XZ plane) and FIG. 1B shows a section perpendicular to the air bearing surface (section along the YZ plane). FIG. 2 is a plan view showing the configuration of a main portion of the thin film magnetic head illustrated in FIGS. 1A and 1B. FIG. 3 shows a perspective configuration of the main portion of the thin film magnetic head. An arrow D shown in FIGS. 1A and 1B and FIG. 3 indicates the travel direction of a recording medium (not shown) relative to the thin film magnetic head (medium travel direction).

In the following description, the distance in the X-axis direction shown in FIGS. 1A and 1B to FIG. 3 will be described as "width", the distance in the Y-axis direction will be described as "length", and the distance in the Z-axis direction will be described as "height or thickness". The side closer to the air bearing surface in the Y-axis direction will be described as "front side or forward" and the side opposite to the front side will be described as "rear side or rearward". The words will be similarly used in FIGS. 4A and 4B and subsequent drawings.

The thin film magnetic head is, for example, mounted on a magnetic recording apparatus such as a hard disk drive to perform a magnetic process on a magnetic recording medium (hereinbelow, simply called a "recording medium") such as a hard disk moving in a medium travel direction D. Concretely, the thin film magnetic head is a composite head capable of executing both of recording and reproducing processes as magnetic processes. As shown in FIGS. 1A and 1B, the thin film magnetic head has a configuration obtained by sequentially stacking, on a substrate 1 made of a ceramic material such as AlTiC ($Al_2O_3$.TiC), an insulating layer 2 made of a non-magnetic insulating material such as aluminum oxide ($Al_2O_3$, hereinbelow, simply called "alumina"), a reproducing head portion 100A for executing a reproducing process by using a magneto-resistive (MR) effect, an isolation layer 7 made of a non-magnetic insulating material such as alumina, a recording head portion 100B of a shield type for executing a recording process of a perpendicular recording method, and an overcoat layer 17 made of a non-magnetic insulating material such as alumina.

The reproducing head portion 100A has, for example, a configuration in which a lower read shield layer 3, a shield gap film 4, and an upper read shield layer 5 are stacked in this order. In the shield gap film 4, an MR device 6 as a reproducing device is buried so that one end face is exposed in a recording-medium-facing surface (air bearing surface) 40 which faces a recording medium.

The lower and upper read shield layers 3 and 5 are used to magnetically isolate the MR device 6 from the periphery and extend rearward from the air bearing surface 40. The lower and upper read shield layers 3 and 5 are made of, for example, a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 μm to 2.0 μm.

The shield gap film 4 is used to electrically isolate the MR device 6 from the periphery and is made of, for example, a non-magnetic insulating material such as alumina.

The MR device 6 is provided to execute a reproducing process by using a magneto-resistive effect such as GMR (Giant Magneto-Resistive) effect or TMR (Tunneling Magneto-Resistive) effect.

The recording head portion 100B has a configuration, for example, in which a magnetic pole layer 20 whose periphery is buried by insulating layers 9 and 11, a gap layer 12 having an opening for magnetic coupling (back gap 12BG), a thin film coil 14 buried by an insulating layer 15, and a write shield layer 30 are stacked in this order. FIGS. 2 and 3 show only the magnetic pole layer 20 and its peripheral structure in the thin film magnetic head illustrated in FIGS. 1A and 1B.

The magnetic pole layer 20 is provided to contain a magnetic flux generated by the thin film coil 14 and to emit the magnetic flux toward a recording medium. The magnetic pole layer 20 extends rearward from the air bearing surface 40. Concretely, the magnetic pole layer 20 extends to a position corresponding to the back gap 12BG provided in the gap layer 12.

The magnetic pole layer 20 includes, as shown in FIGS. 2 and 3, a uniform width portion P1 extended from the air bearing surface 40, having uniform width W1 (W1 is about 0.15 μm) which specifies recording track width of a recording medium, and having an exposed surface M1 exposed on the air bearing surface 40, and a wide portion P2 coupled to the rear end of the uniform width portion P1, extended with width W2 larger than the width W1, and having widened end surfaces M2 along the increased width. The widened end surfaces M2 denotes front end surfaces of portions (wing portions P2W) positioned on both sides (in the width direction) of the uniform width portion P1 in the wide portion P2 when the position of the uniform width portion P1 is set as a reference in the width direction (X-axis direction). In the magnetic pole layer 20, the position at which the width starts increasing from the uniform width portion P1 (width W1) to the wide portion P2 (width W2) is a "flare point FP (width increasing position)" as one of important factors for determining the recording performance of the thin film magnetic head. Height (dimension in the Z-axis direction) H2 of the widened end surface M2 is smaller than height H1 of the exposed surface M1 (H2<H1). In particular, thickness P2 of the wing portion P2W in the wide portion P2 is smaller than the thickness T1 of the uniform width portion P1, for example, at least on the side close to the widened end surface M2 (T2<T1). The ratio (thickness ratio) T2/T1 of the thickness T2 of the wing portion P2W to the thickness T1 of the uniform width portion P1 lies in a range from 0.3 to less than 1.0 ($0.3 \leq T2/T1 < 1.0$), preferably, in a range from 0.3 to 0.75 ($0.3 \leq T2/T1 \leq 0.75$) and, more preferably, in a range from 0.3 to 0.5 ($0.3 \leq T2/T1 \leq 0.5$).

Concretely, the magnetic pole layer 20 has a structure in which, for example, as shown in FIGS. 1A and 1B to FIG. 3, an auxiliary magnetic pole layer 8 disposed on the leading side and a main magnetic pole layer 10 disposed on the trailing side are stacked. The main magnetic pole layer 10 functions as a main magnetic flux emitting portion and extends from the air bearing surface 40 to a position corresponding to the back gap 12BG. The auxiliary magnetic pole layer 8 functions as an auxiliary magnetic flux containing portion for the main magnetic pole layer 10 and extends from a position receded from the air bearing surface 40 to the position corresponding to the back gap 12BG. The "trailing side" is a side of outflow of a recording medium (D side in the medium travel direction) when a traveling state of the recording medium traveling to the D side in the medium travel direction shown in FIGS. 1A and 1B to FIG. 3 is regarded as a flow. In this case, the trailing side is an upper side in the thickness direction (Z-axis direction). On the other side, an inflow side (the side opposite to the D side in the medium travel direction) is called the "leading side" and is a downward side in the thickness direction.

The main magnetic pole layer 10 includes, for example, as shown in FIG. 2, a lower main magnetic pole layer 10A (first magnetic pole layer portion) extending rearward from the flare point FP and having the width W2 corresponding to the width of the wide portion P2, and an upper main magnetic pole layer 10B (second magnetic pole layer portion) extending rearward from the air bearing surface 40, passing the flare point FP and extending on the lower main magnetic pole layer 10A, having the width W1 corresponding to the width of the uniform width portion P1 in a portion at least on the front side of the flare point FP, and having a generally flat end surface M3 on the trailing side. The lower main magnetic pole layer 10A extends adjacent to the insulating layer 9 and the auxiliary magnetic pole layer 8. The lower main magnetic pole layer 10A has, for example, the uniform width W2 in a rear portion and the width W2 is narrowed toward the width W1 in the front side. The upper main magnetic pole layer 10B has, for example, an integral structure in which a front end portion 10B1, an intermediate portion 10B2, and a rear end portion 10B3 are integrated. The front end portion 10B1 extends from the air bearing surface 40 to the flare point FP so as to be adjacent to the insulating layer 9 and has the uniform width W1. The intermediate portion 10B2 is coupled to the rear end of the front end portion 10B1, extends on the lower main magnetic pole layer 10A, and has the uniform width W1 like the front end portion 10B1. The rear end portion 10B3 is coupled to the rear end of the intermediate portion 10B2, extends on the lower main magnetic pole layer 10A, and has width W3 larger than the width W1 and smaller than the width W2. The wide portion P2 is specified mainly on the basis of the lower main magnetic pole layer 10A and the intermediate portion 10B2 and the rear end portion 10B3 in the upper main magnetic pole layer 10B, and the uniform portion P1 is specified on the basis of the upper main magnetic pole layer 10B (front end portion 10B1). In particular, saturated magnetic flux density J1 of the upper main magnetic pole layer 10B is equal to or higher than saturated magnetic flux density J2 of the lower main magnetic pole layer 10A (J1≧J2). Concretely, the upper main magnetic pole layer 10B is constructed by a plating film made of, for example, an iron-cobalt-based alloy and the lower main magnetic pole layer 10A is constructed by a plating film made of an iron-cobalt-based alloy, permalloy, or the like. The iron-cobalt-based alloy is, for example, an iron cobalt alloy (FeCo) or an iron cobalt nickel alloy (FeCoNi).

The auxiliary magnetic pole layer 8 has, for example as shown in FIG. 2, a rectangular planar shape having the width W2. The insulating layers 9 and 11 are provided to electrically isolate the auxiliary magnetic pole layer 8 and the main magnetic pole layer 10 from the periphery, respectively, and are made of, for example, a non-magnetic insulating material such as alumina.

The gap layer 12 is to construct a gap for magnetically isolation between the magnetic pole layer 20 and the write shield layer 30. The gap layer 12 is made of, for example, a non-magnetic material such as alumina and has a thickness of about 0.2 μm or less.

The thin film coil 14 generates a magnetic flux for recording and is made of, for example, a high-conductive material such as copper (Cu). The thin film coil 14 has, for example, a winding structure of spiral turns around one end as a center. In FIGS. 1A and 1B and FIG. 2, only a part of a plurality of turns constructing the thin film coil 14 is shown.

The insulating layer 15 covers the thin film coil 14 to electrically isolate it from the periphery and is disposed on the gap layer 12 so as not to cover the back gap 12BG. The insulating layer 15 is made of a photoresist (photosensitive resin), spin on glass (SOG), or the like which displays fluidity when heated. A peripheral portion of the insulating layer 15 has a rounded and inclined surface. The position of the front end of the insulating layer 15 is a "throat height zero position TP" as one of important factors determining the recording performance of the thin film magnetic head. The distance between the throat height zero position TP and the air bearing surface 40 is "throat height TH". The throat height TH is about 0.3 μm or less. FIGS. 1A and 1B and FIG. 2 show, as an example, the case where the throat height zero position TP coincides with the flare point FP.

The write shield layer 30 is provided to receive a spread component of a magnetic flux emitted from the magnetic pole layer 20 and to prevent spread of the magnetic flux. The write shield layer 30 extends rearward from the air bearing surface 40 on the trailing side of the magnetic pole layer 20. The write shield layer 30 is isolated from the magnetic pole layer 20 by the gap layer 12 on the side close to the air bearing surface 40 and is adjacent to and magnetically coupled to the magnetic pole layer 20 via the back gap 12BG on the side far from the air bearing surface 40. In particular, the write shield layer 30 includes, for example, two separate components; a TH specifying layer 13 functioning as a main magnetic flux receiving port, and a yoke layer 16 functioning as a passage of the magnetic flux received by the TH specifying layer 13.

The TH specifying layer 13 is adjacent to the gap layer 12 and extends from the air bearing surface 40 to a position between the air bearing surface 40 and the back gap 12BG, concretely, a position between the air bearing surface 40 and the thin film coil 14. The TH specifying layer 13 is made of, for example, a magnetic material such as permalloy or iron-cobalt-based alloy and has a rectangular planar shape having width W4 larger than the width W2 of the magnetic pole layer 20 (W4>W2) as shown in FIG. 2. The insulating layer 15 in which the thin film coil 14 is buried is adjacent to the TH specifying layer 13. That is, the TH specifying layer 13 has a role of specifying the front end position (throat height zero position TP) of the insulting layer 15, more concretely, specifying the throat height TH.

The yoke layer 16 extends from the air bearing surface 40 to the back gap 12BG so as to cover the insulating layer 15. A front portion of the yoke layer 16 is formed on the TH specifying layer 13 and is magnetically coupled and a rear portion of the yoke layer 16 is adjacent to and magnetically coupled to the magnetic pole layer 20 via the back gap 12BG. The yoke layer 16 is made of, for example, a magnetic material similar to that of the TH specifying layer 13 and has a rectangular planar shape having the width W4 like the TH specifying layer 13 as shown in FIG. 2.

The operation of the thin film magnetic head will now be described with reference to FIGS. 1A and 1B to FIG. 3.

In the thin film magnetic head, at the time of recording information, when a current flows into the thin film coil 14 of the recording head portion 100B from a not-shown external circuit, a magnetic flux is generated by the thin film coil 14. The magnetic flux generated at this time is contained by the magnetic pole layer 20 and flows mainly from the lower main magnetic pole layer 10A to the front end portion 10B1 of the upper main magnetic pole layer 10B in the magnetic pole layer 20. Since the magnetic flux flowing in the magnetic pole layer 20 is converged at the flare point FP as the width of the magnetic pole layer 20 decreases, the magnetic flux is concentrated on end surface (trailing edge) TE on the trailing side of the front end portion 10B1. When the magnetic flux concentrated on the portion of the trailing edge TE is emitted from the front end portion 10B1 to the outside, a recording magnetic field is generated in the direction orthogonal to the surface of a recording medium and the recording medium is magnetized in the perpendicular direction by the recording magnetic field, thereby magnetically recording information onto the recording medium. At the time of recording information, a spread component of the magnetic flux emitted from the front end portion 10B1 is received by the write shield layer 30, so that spread of the magnetic flux is prevented. The magnetic flux received by the write shield layer 30 is returned to the magnetic layer 20 via the back gap 12BG.

On the other hand, at the time of reproducing, when a sense current flows into the MR device 6 in the reproducing head portion 100A, the resistance value of the MR device 6 changes according to a signal magnetic field for reproducing from the recording medium. Since the resistance change is detected as a change in the sense current, the information recorded on the recording medium is magnetically read.

A method of manufacturing the thin film magnetic head shown in FIGS. 1A and 1B to FIG. 3 will now be described with reference to FIGS. 1A and 1B to FIGS. 9A and 9B. FIGS. 4A and 4B to FIGS. 9A and 9B are diagrams for explaining processes of manufacturing the thin film magnetic head and show sectional configurations corresponding to FIGS. 1A and 1B.

In the following, first, an outline of processes of manufacturing a whole thin film magnetic head will be described with reference to FIGS. 1A and 1B. After that, processes of forming a main portion (the main magnetic pole layer 10) of the thin film magnetic head will be described in detail with reference to FIGS. 1A and 1B to FIGS. 9A and 9B. Since the materials, dimensions, structural features, and the like of the series of the components of the thin film magnetic head have been already described in detail, the description will not be repeated.

The thin film magnetic head is manufactured by sequentially forming and stacking the components by mainly using an existing thin film process including a film forming technique such as plating and sputtering, a patterning technique such as photolithography technique, and an etching technique such as dry etching. Specifically, first, as shown in FIGS. 1A and 1B, the insulating layer 2 is formed on the substrate 1 and, after that, the lower read shield layer 3, the shield gap film 4 in which the MR device 6 is buried, and the upper read shield layer 5 are stacked on the insulating layer 2 in accordance with this order, thereby forming the reproducing head portion 100A. Subsequently, the isolation layer 7 is formed on the reproducing head portion 10A. On the isolation layer 7, by sequentially stacking the magnetic pole layer 20 (the auxiliary magnetic pole layer 8 and the main magnetic pole layer 10) whose periphery is buried by the insulating layers 9 and 11, the gap layer 12 in which the back gap 12BG is provided, the insulating layer 15 burying the thin film coil 14, and the write shield layer 30 (the TH specifying layer 13 and the yoke layer 16), the recording head portion 100B is formed. Finally, the overcoat layer 17 is formed on the recording head portion 100B and, after that, the air bearing surface 40 is formed by machining and polishing process, thereby completing the thin film magnetic head.

At the time of forming the main magnetic pole layer 10 as a main portion of the thin film magnetic head, the insulating layer 9 is buried around the auxiliary magnetic pole layer 8.

After that, first, as shown in FIGS. 4A and 4B, a plating film made of a magnetic material having the saturated magnetic flux density J2 such as an iron-cobalt-based alloy or permalloy is grown on the auxiliary magnetic pole layer 8 and the insulating layer 9 therearound by using a plating process, thereby pattern-forming the lower main magnetic pole layer 10A as a part of the main magnetic pole layer 10. The lower main magnetic pole layer 10A is formed so as to have, for example, as shown in FIG. 2, a planar shape having the width W2 corresponding to the width of the wide portion P2. Concretely, a rear portion of the lower main magnetic pole layer 10A has the width W2 and the width is reduced from the width W2 to the width W1 in the front portion. In particular, the front end is finally positioned to the flare point FP. Concretely, for example, the front end is finally receded from the position of the air bearing surface 40 only by about 0.1 µm to 1.0 µm and the lower main magnetic pole layer 10A has the thickness T2 smaller than the thickness T0 of a precursor magnetic pole layer pattern 10BX (refer to FIGS. 5A and 5B) formed in a post process (T2<T0).

An example of the procedure of forming the lower main magnetic pole layer 10A by using the plating process is as follows. First, a seed layer (not shown) for the plating process is formed on the auxiliary magnetic pole layer 8 and the insulating layer 9 therearound and, after that, a photoresist is applied on the seed layer, thereby forming a photoresist film (not shown). Subsequently, the photoresist film is patterned by using the photolithography process, thereby forming a photoresist pattern for forming the low main magnetic pole layer 10A. Subsequently, by growing a plating film by using the photoresist pattern with the seed layer, the lower main magnetic pole layer 10A made by the plating film is formed. After forming the lower main magnetic pole layer 10A, the photoresist pattern used for forming the lower main magnetic pole layer 10A is removed.

Figures 5A, 5B:
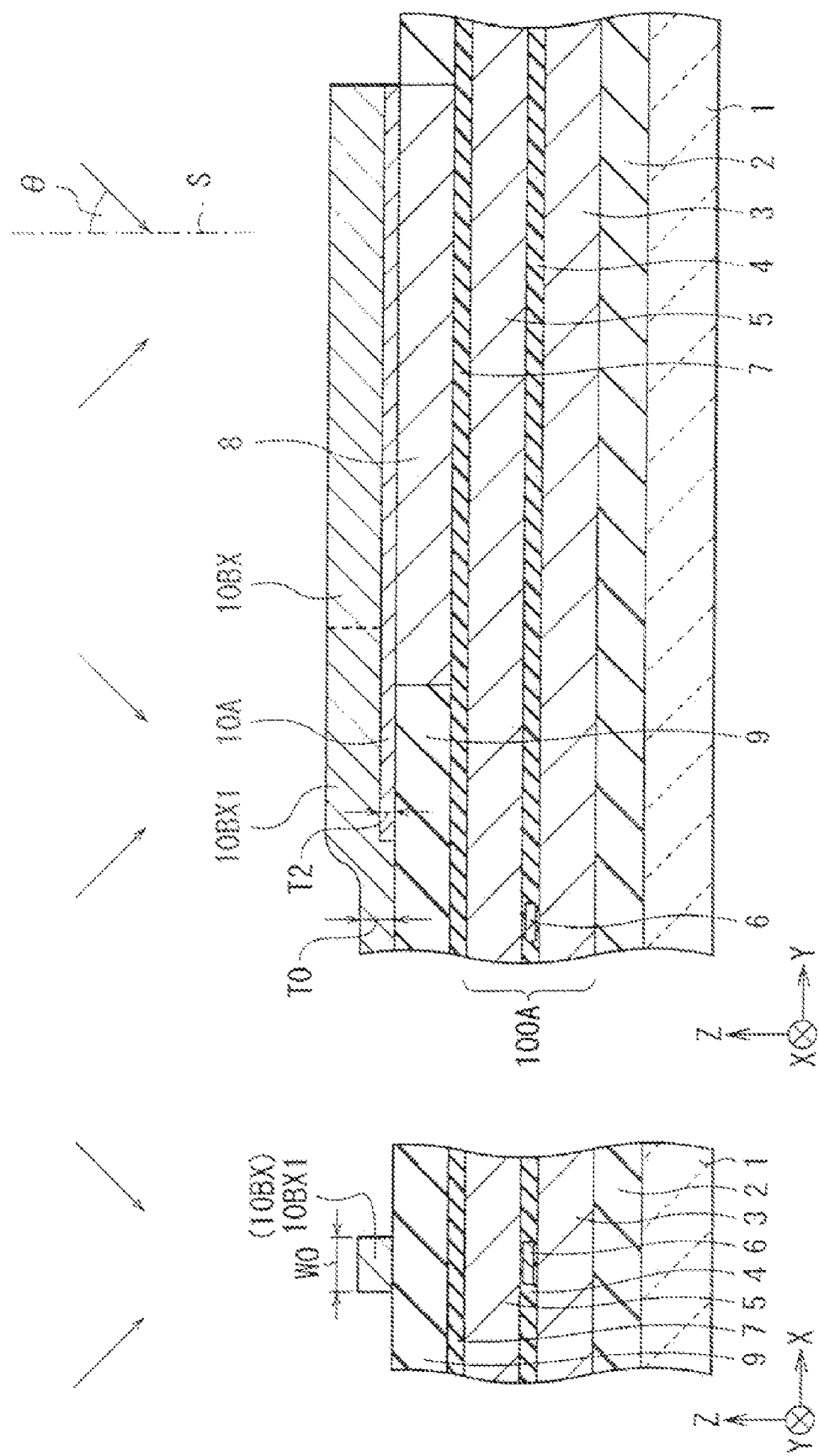
FIGS. 5A and 5B are cross sections showing a process subsequent to FIGS. 4A and 4B.

Subsequently, as shown in FIGS. 5A and 5B, the seed layer formed in the preceding process to form the lower main magnetic pole layer 10A is used again. For example, by using the plating process, a plating film made of a magnetic material having the saturated magnetic flux density J1 equal to or higher than the saturated magnetic flux density J2 of the lower main magnetic pole layer 10A (J1≧J2), concretely, an iron-cobalt-based alloy is grown on the exposed surface of the insulating layer 9 on the front side of the lower main magnetic pole layer 10A and on the lower main magnetic pole layer 10A, thereby forming the precursor magnetic pole layer pattern 10BX as a preparation layer for forming the upper main magnetic pole layer 10B. The precursor magnetic pole layer pattern 10BX is formed, for example, so as to have a configuration similar to that of the upper main magnetic pole layer 10B except for the point that a portion 10BX1 corresponding to an assembly of the front end portion 10B1 and the intermediate portion 10B2 shown in FIG. 2 is provided and the corresponding portion 10BX1 has width W0 larger than the width W1, and has thickness T0 larger than the thickness T2 of the lower main magnetic pole layer 10A formed in the preceding process.

Figure 6B:
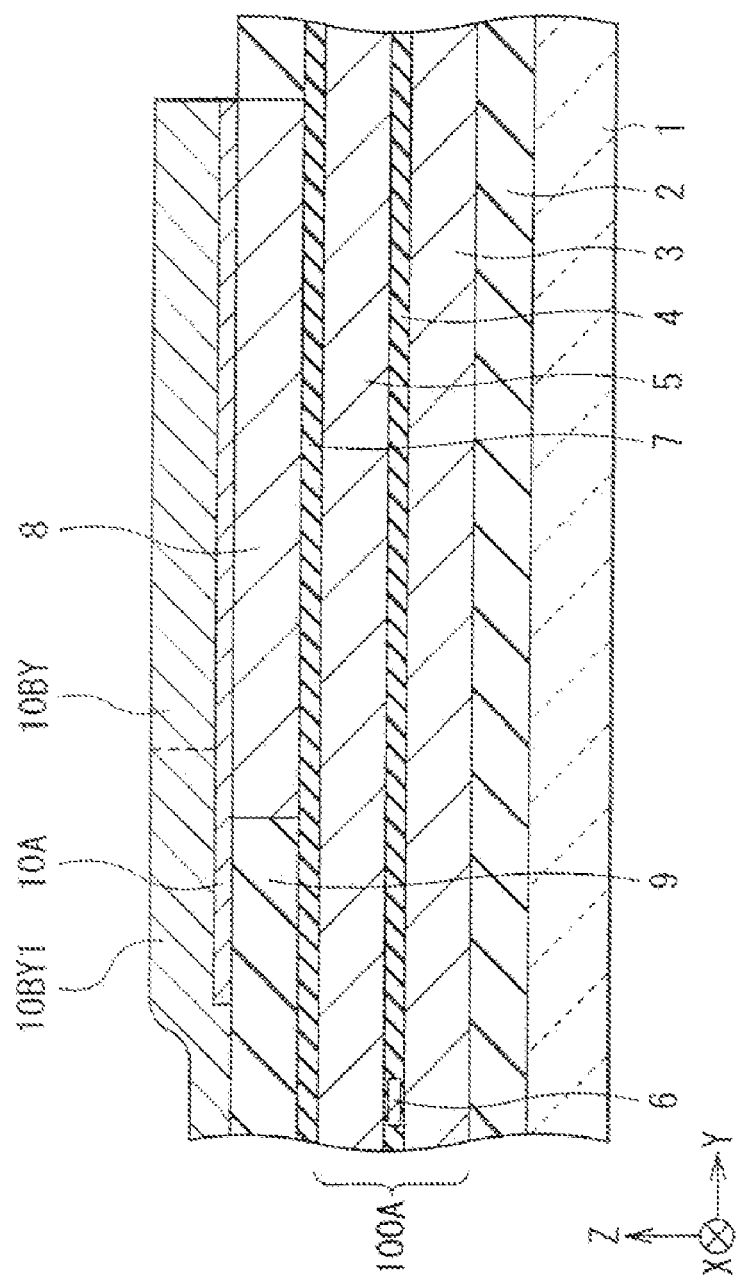
FIGS. 6A and 6B are cross sections showing a process subsequent to FIGS. 5A and 5B.
Figure 6A:
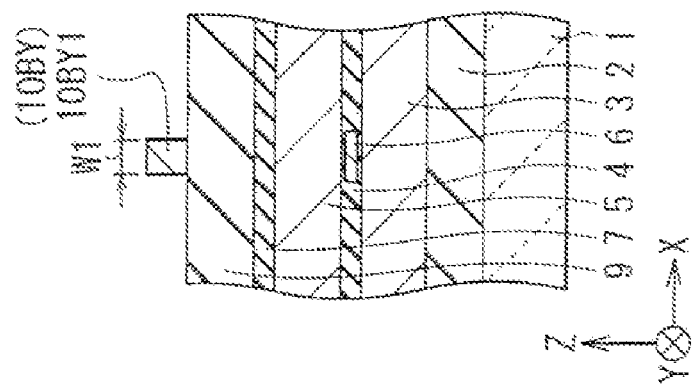

Subsequently, as shown in FIGS. 5A and 5B, the precursor magnetic pole layer pattern 10BX is etched by using, for example, ion milling. Concretely, an etching process is performed on the precursor magnetic pole layer pattern 10BX by irradiation with ion beams from directions each forming an angle θ (for example, θ is about 40° to 70°) from a perpendicular line S to an extended plane of the precursor magnetic pole layer pattern 10BX. By the etching process, the width of the corresponding portion 10BX1 is narrowed from the width W0 to the width W1 by using mainly an etching action in the width direction. Therefore, as shown in FIGS. 6A and 6B, a precursor magnetic pole layer pattern 10BY including a corresponding portion 10BY1 having the uniform width W1 is formed. By the etching process, the precursor magnetic pole layer pattern 10BY is formed and, simultaneously, the seed layer exposed around the lower main magnetic pole layer 10A and the precursor magnetic pole layer pattern 10BY is etched, thereby selectively eliminating an unnecessary portion of the seed layer. Although it has been mainly described that the corresponding portion 10BX1 in the precursor magnetic pole layer pattern 10BX is etched, obviously, not only the corresponding portion 10BX1 in the precursor magnetic pole layer pattern 10BX but also other portions except for the corresponding portion 10BX are etched.

Figure 7B:
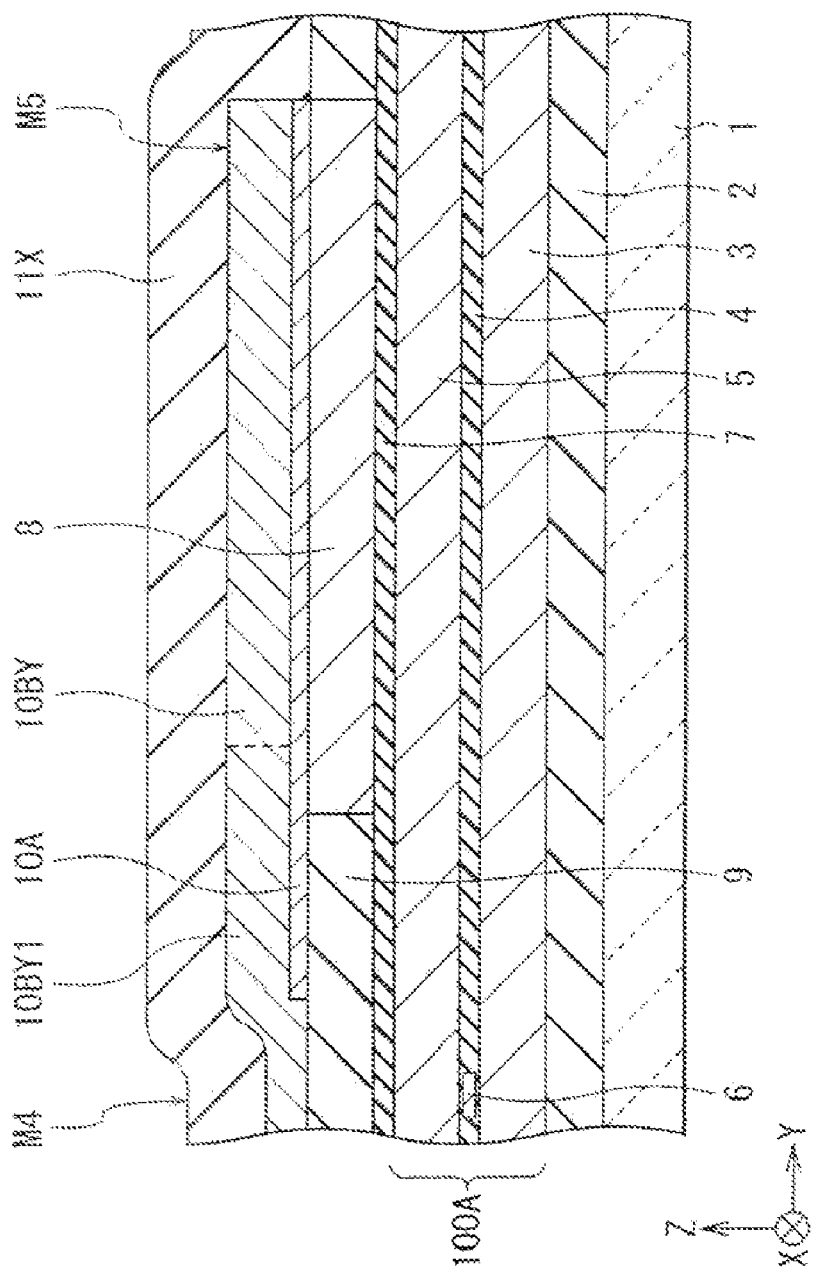
FIGS. 7A and 7B are cross sections showing a process subsequent to FIGS. 6A and 6B.
Figure 7A:
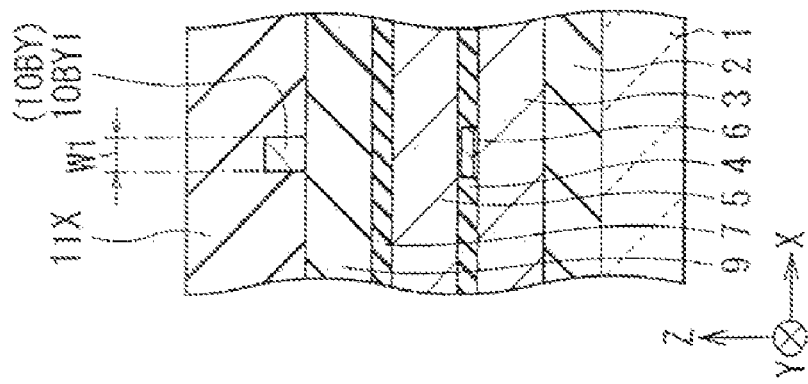

As shown in FIGS. 7A and 7B, for example, by using sputtering, the precursor insulating layer 11X as a preparation layer for forming the insulating layer 11 is formed so as to cover the lower main magnetic pole layer 10A, the precursor magnetic pole layer pattern 10BY, and their peripheries. At the time of forming the precursor insulating layer 11X, for example, the lower main magnetic pole layer 10A and the precursor magnetic pole layer pattern 10BY are completely buried. More concretely, the lowest surface M4 of the precursor insulating layer 11X is set to be higher than the uppermost surface M5 of the precursor magnetic pole layer pattern 10BY.

Figure 8B:
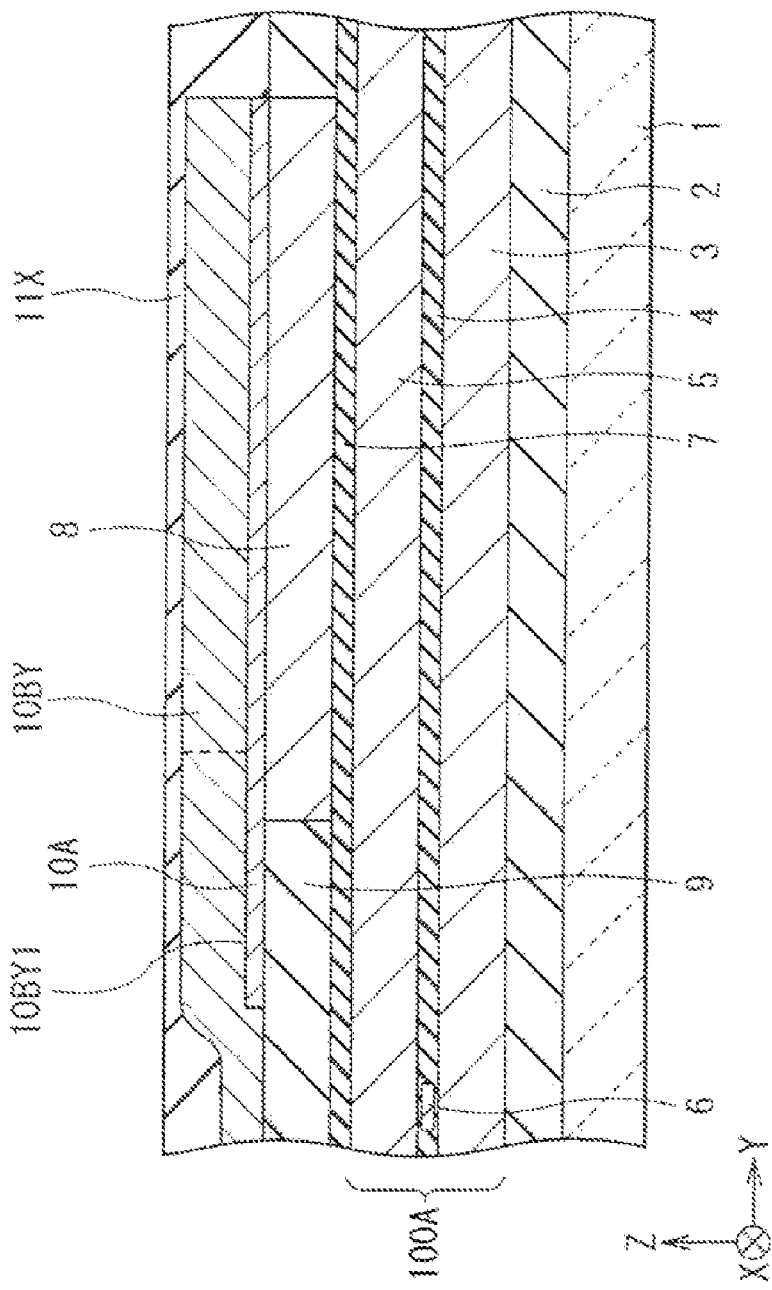
FIGS. 8A and 8B are cross sections showing a process subsequent to FIGS. 7A and 7B.
Figure 8A:
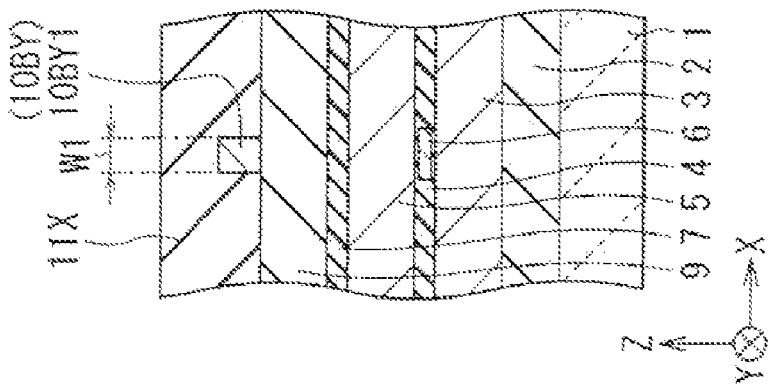
Figure 9B:
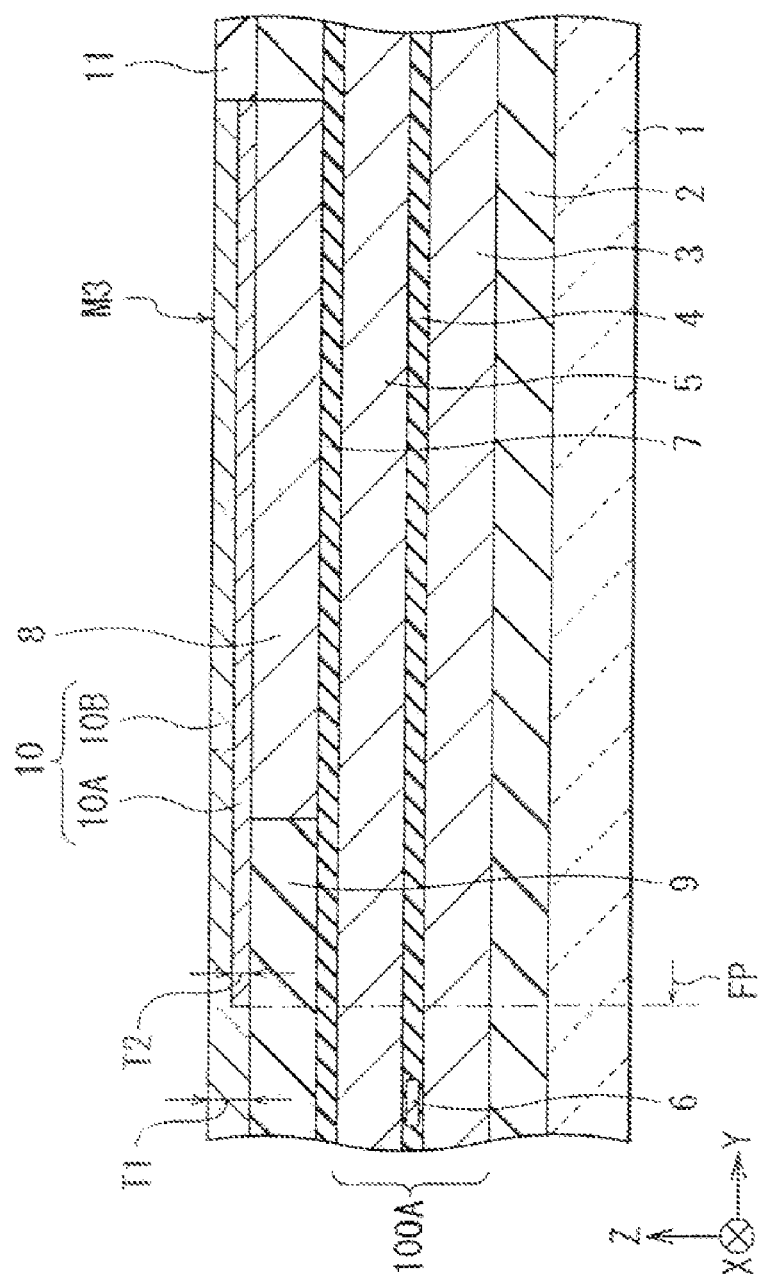
FIGS. 9A and 9B are cross sections showing a process subsequent to FIGS. 8A and 8B.
Figure 9A:
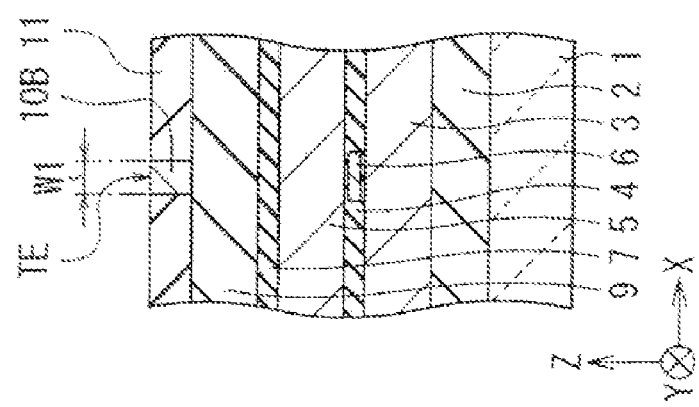

Subsequently, for example, by using CMP (Chemical Mechanical Polishing), the precursor insulating layer 11X is polished together with the precursor magnetic pole layer pattern 10BY until the whole end surface on the trailing side of the precursor magnetic pole layer pattern 10BY is planarized. After the precursor insulating layer 11X is polished as shown in FIGS. 8A and 8B by the polishing process, the precursor magnetic pole layer pattern 10BY is polished together with the precursor insulating layer 11X. Consequently, as shown in FIGS. 9A and 9B, the upper main magnetic pole layer 10B as another part of the main magnetic pole layer 10 is pattern-formed, and the insulating layer 11 is formed so as to bury the peripheries of the upper and lower main magnetic pole layers 10B and 10A. The upper main magnetic pole layer 10B is formed so that, for example, as shown in FIG. 2, the front end portion 10B1 has the thickness T1 larger than the thickness T2 of the lower main magnetic pole layer 10A and is adjacent to the insulating layer 9, the intermediate portion 10B2 and the rear end portion 10B3 extend on the lower main magnetic pole layer 10A, and the entire end surface M3 on the trailing side is flat. Consequently, as shown in FIGS. 1A and 1B to FIG. 3, the main magnetic pole layer 10 including the lower and upper magnetic pole layers 10A and 10B, having the wide portion P2 specified on the basis of the lower main magnetic pole layer 10A and having the uniform width portion P1 specified on the basis of the upper main magnetic pole layer 10B is completed. The main magnetic pole layer 10 is formed so that, as shown in FIG. 2, the height H2 of the widened end surface M2 in the lower main magnetic pole layer 10A specifying the wide portion P2 is smaller than the height H1 of the exposed surface M1 in the upper main magnetic pole layer 10B (front end portion 10B1) specifying the uniform width portion P1 (H2<H1) and, for example, the thickness T2 of the wing portion P2W in the lower main magnetic pole layer 10A is smaller the thickness T1 of the upper main magnetic pole layer 10B (front end portion 10B1) (T2<T1).

In the thin film magnetic head according to the embodiment, in the main magnetic pole layer 10 including the uniform width portion P1 and the wide portion P2, the height H2 of the widened end surface M2 in the wide portion P2 is larger than the height H1 of the exposed surface M1 in the uniform width portion P1 (H2<H1). Therefore, for the following reason, unintentional writing to an adjacent track can be suppressed and information recorded on a recording medium can be prevented from being erased.

Figure 10:
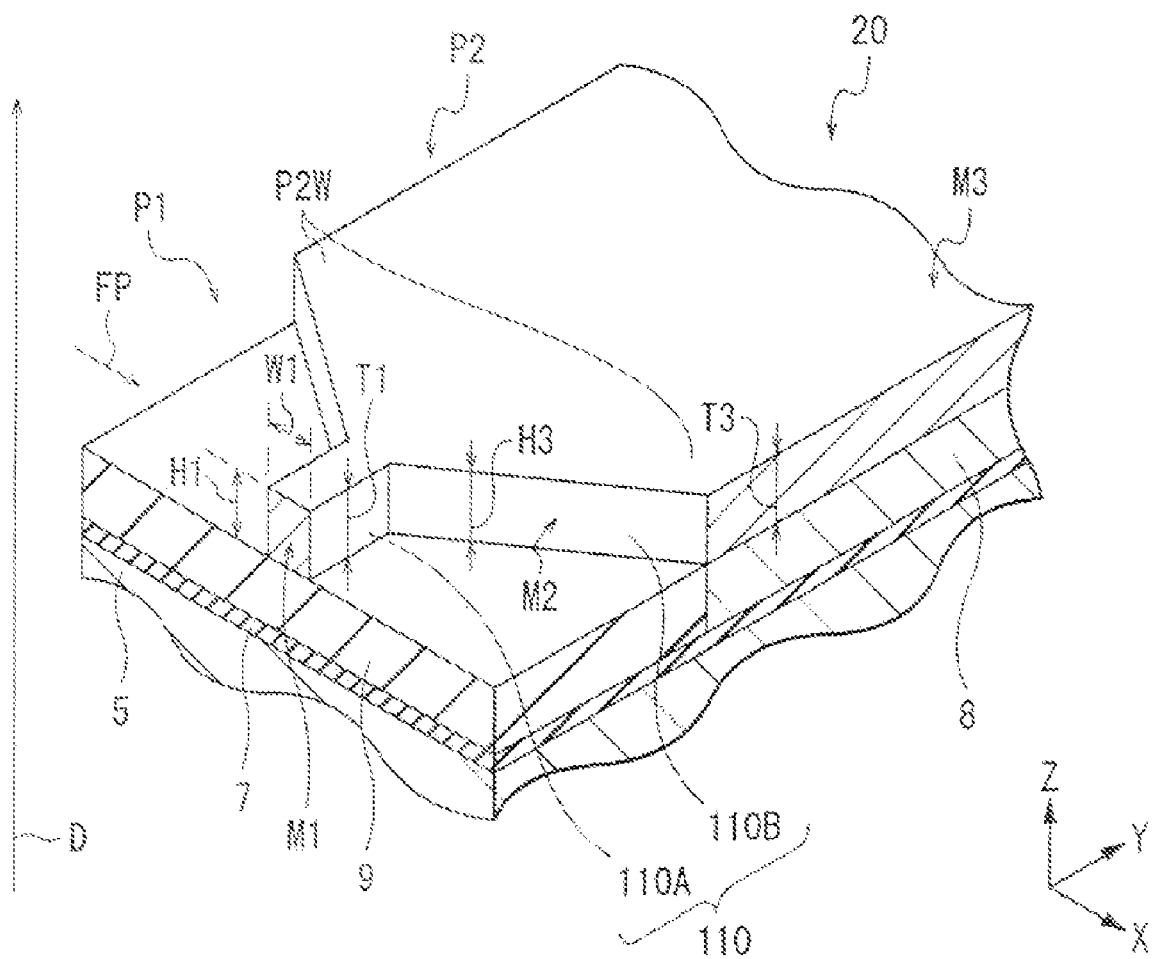
FIG. 10 is a perspective view for explaining problems of a thin film magnetic head as a comparative example of the thin film magnetic head according to the embodiment of the invention.

FIG. 10 is a perspective view showing the configuration of a main portion of a thin film magnetic head as a comparative example of the thin film magnetic head according to the embodiment shown in FIG. 3. The thin film magnetic head as the comparative example has a configuration similar to that of the thin film magnetic head of the embodiment shown in FIG. 3 except for the point that a main magnetic pole layer 110 is provided in place of the main magnetic pole layer 10. The main magnetic pole layer 110 has two components which are integrated and magnetically coupled to each other; a front end portion 110A having the thickness T1 and the height H1 (exposed surface M1) and having a configuration similar to that of the front end portion 10B1 in the upper main magnetic pole layer 10B, and a rear end portion 110B having a configuration similar to that of the lower main magnetic pole layer 10A except for the point that it has thickness T3 equal to the thickness T1 of the front end portion 110A (T3=T1) and the height H3 (widened end surface M2). In the thin film magnetic head of the comparative example, the uniform width portion P1 is specified on the basis of the front end portion 110A in the main magnetic pole layer 110 and the wide portion P2 is specified on the basis of the rear end portion 110B.

In the thin film magnetic head of the comparative example shown in FIG. 10, the height H3 of the widened end surface M2 in the rear end portion 110B specifying the wide portion P2 is equal to the height H1 of the exposed surface M1 in the front end portion 110A specifying the uniform width portion P1 (H3=H1), that is, the area of the widened end surface M2 is too large relative to the area of the exposed surface M1. Therefore, when the amount of the magnetic flux flowing in the rear end portion 110B becomes large at the time of recording information, as described in the background of the invention, the magnetic flux flowing in the rear end portion 110B is normally emitted via the front end portion 110A from the exposed surface M1 toward a recording medium. Moreover, the magnetic flux is unintentionally emitted from the widened end surfaces M2 without passing through the front end portion 110A toward the recording medium. As a result, writing is unintentionally performed on a neighboring track due to the unnecessary magnetic flux emitted from the rear end portion 110B and information recorded on the neighboring track is erased.

In contrast, in the thin film magnetic head of the embodiment shown in FIG. 3, the height H2 of the widened end surface M2 in the lower main magnetic pole layer 10A specifying the wide portion P2 is smaller than the height H1 of the exposed surface M1 in the upper main magnetic pole layer 10B specifying the uniform width portion P1 (H2<H1), so that the area of the widened end surface M2 as a port of emitting an unnecessary magnetic flux causing unintended writing to a neighboring track is reduced. Consequently, even if an amount of the magnetic flux flowing in the lower main magnetic pole layer 10A increases at the time of recording information, as compared with the comparative example, unintentional emission of the magnetic flux flowing in the lower main magnetic pole layer 10A from the widened end surface M2 toward a recording medium without passing through the front end portion 10B1 is suppressed. Therefore, in the embodiment, unintentional writing to a neighboring track can be suppressed and information recorded on a recording medium can be prevented from being erased.

In particular, in the embodiment, the thickness T2 of the wing portion P2W in the lower main magnetic pole layer 10A specifying the wide portion P2 is set to be smaller than the thickness T1 of the upper main magnetic pole layer 10B (front end portion 10B1) specifying the uniform width portion P1 at least on the side close to the widened end surface M2 (T2<T1). By properly setting the thickness T2 in a range smaller than the thickness T1, as compared with the comparative example where the thickness T3 of the wing portion P2W in the rear end portion 110B is equal to the thickness T1 of the front end portion 110A (T3=T1, refer to FIG. 10), a magnetic volume of the lower main magnetic pole layer 10A, that is, an absolute amount of the magnetic flux which can be contained in the lower main magnetic pole layer 10A is properly adjusted so as not to become too large. Therefore, while supplying a sufficient amount of magnetic flux to the upper main magnetic pole layer 10B (front end portion 10B1), the magnetic volume of the lower main magnetic pole layer 10A can be controlled so that the magnetic flux is not unintentionally emitted from the widened end surfaces M2 toward a recording medium without passing through the front end portion 10B1. Thus, also from the viewpoint, the invention can contribute to suppression of unintended writing to a neighboring track.

In this case, particularly, by setting the thickness ratio T2/T1, specifically, the ratio of the thickness T2 of the wing portion P2W to the thickness T1 of the front end portion 10B1 to $0.3 \leq T2/T1 < 1.0$, the thickness ratio T2/T1 is made proper from the viewpoint of controlling the absolute amount of the magnetic flux flowing in the lower main magnetic pole layer 10A. Therefore, unintended writing to a neighboring track can be suppressed more and information recorded on a recording medium can be prevented from being erased more reliably. This effect is improved by narrowing the range of the thickness ratio T2/T1 to $0.3 \leq T2/T1 \leq 0.75$ and, further, to $0.3 \leq T2/T1 \leq 0.5$.

In the embodiment, the saturated magnetic flux density J1 of the upper main magnetic pole layer 10B is set to be equal to or higher than the saturated magnetic flux density J2 of the lower main magnetic pole layer 10A (J1>J2), so that the magnetic flux containing rate per unit volume in the upper main magnetic pole layer 10B is higher than that of the lower main magnetic pole layer 10A. Therefore, as described above with respect to the relation of the thickness T1 and T2 (T2<T1), while supplying a sufficient amount of the magnetic flux to the upper main magnetic pole layer 10B (front end portion 10B1), the magnetic volume of the lower main magnetic pole layer 10A can be controlled so that the magnetic flux is not unintentionally emitted from the widened end surfaces M2 toward a recording medium without passing through the front end portion 10B1. From the viewpoint as well, the invention can contribute to suppression of unintentional writing to a neighboring track.

In the method of manufacturing the thin film magnetic head of the embodiment, to repetitively manufacture a thin film magnetic head including the main magnetic pole layer 10 having a characteristic configuration such that the height H2 of the widened end surface M2 is smaller than the height H1 of the exposed surface M1 with high reproducibility, only an existing manufacturing process is used and a new and complicated manufacturing process is not used. Therefore, the thin film magnetic head according to the embodiment can be manufactured easily and stably.

In the embodiment, the upper main magnetic pole layer 10B is formed by planarizing the end surface on the trailing side of the precursor magnetic pole layer pattern 10BY by using a polishing process, the trailing edge TE of the upper main magnetic pole layer 10B is specified on the basis of the planarized end surface M3. Therefore, the main magnetic pole layer 10 can be easily formed so that the trailing edge TE as a substantial recording portion in the magnetic pole layer 20 becomes flat.

Figure 11:
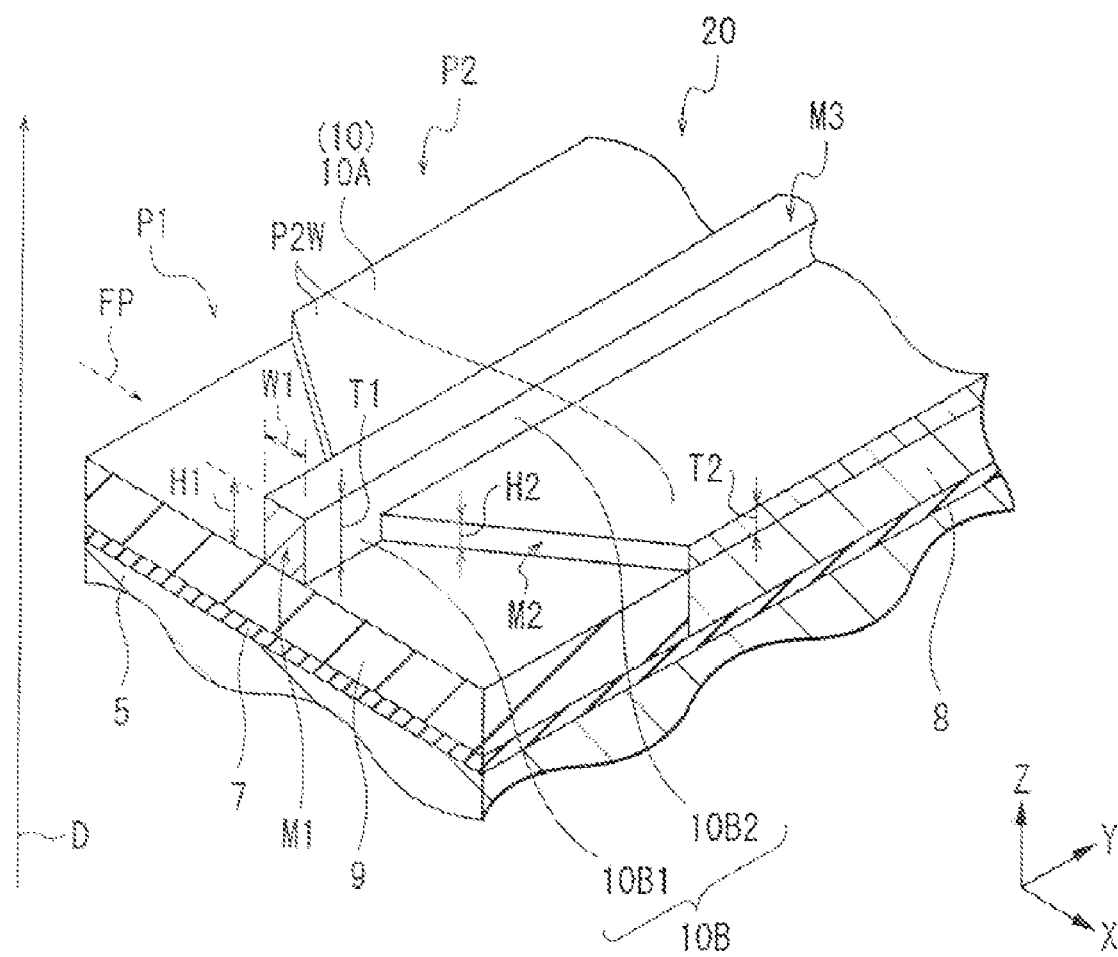
FIG. 11 is a perspective view showing a modification of the configuration of the thin film magnetic head according to the embodiment of the invention.

In the embodiment, as shown in FIGS. 2 and 3, the upper main magnetic pole layer 10B is formed so as to include the front end portion 10B1 (width W1), the intermediate portion 10B2 (width W1), and the rear end portion 10B3 (width W3). The invention is not always limited to the configuration. For example, as shown in FIG. 11, the upper main magnetic pole layer 10B may be constructed so as to include only the front end portion 10B1 and the intermediate portion 10B2 without including the rear end portion 10B3. In this case as well, effects similar to those of the foregoing embodiment can be obtained. Characteristics except for the characteristic of the configuration of the thin film magnetic head shown in FIG. 11 are similar to those of the case shown in FIG. 3.

Figure 12B:
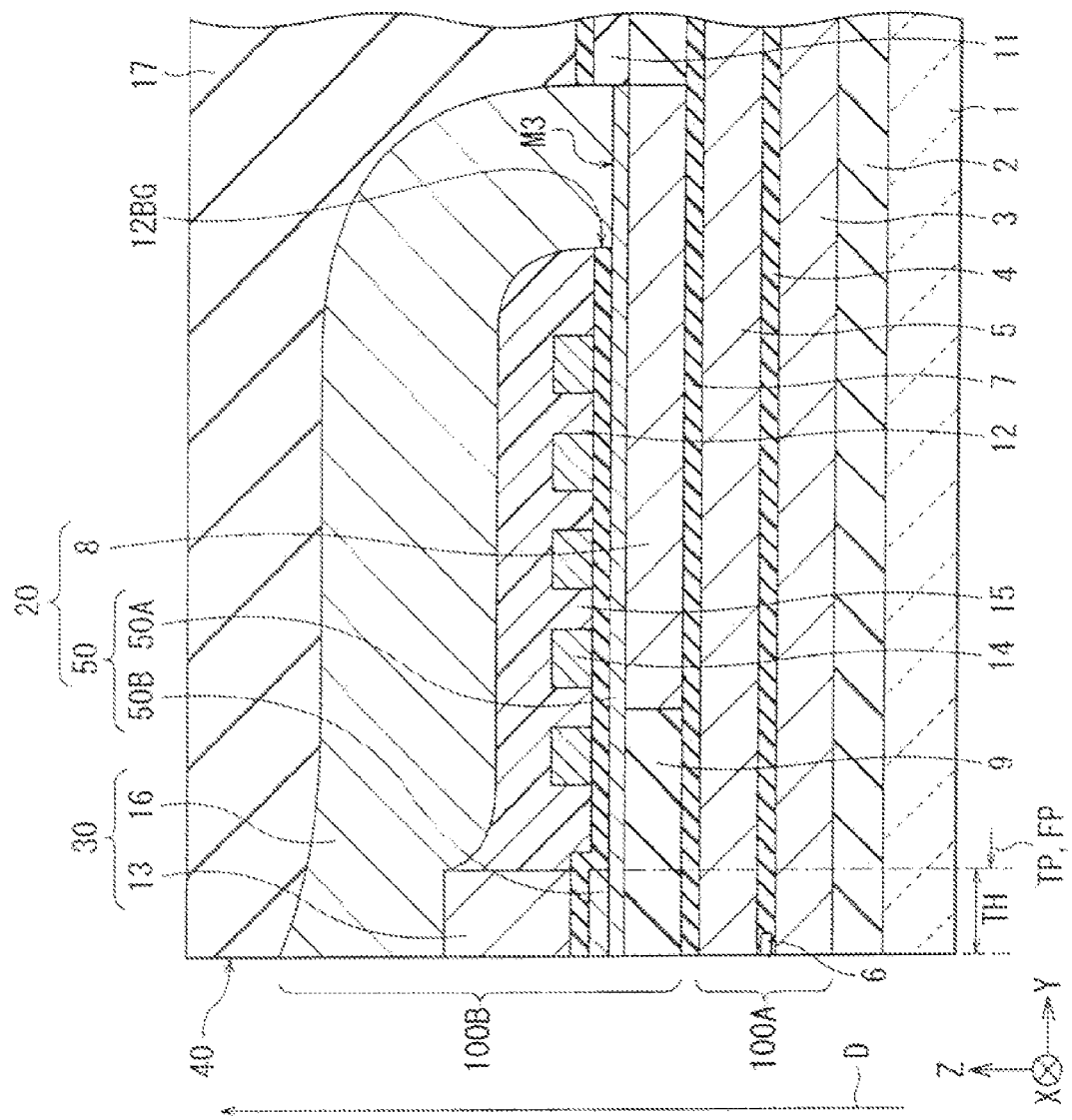
FIGS. 12A and 12B are cross sections illustrating another modification of the configuration of the thin film magnetic head according to the embodiment of the invention.
Figure 12A:
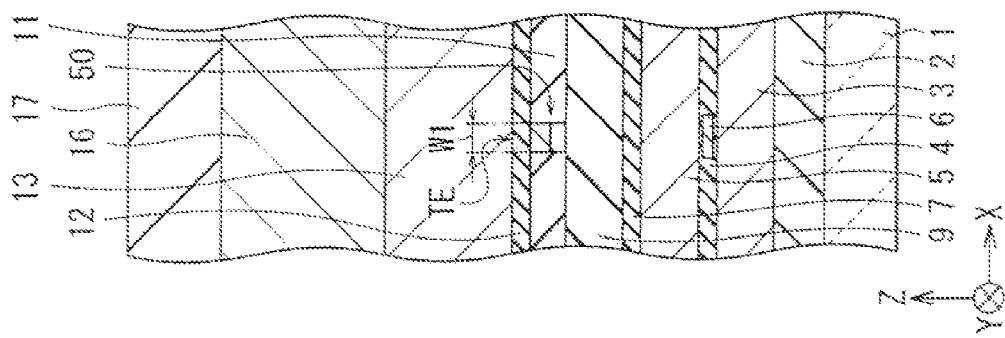
Figure 13:
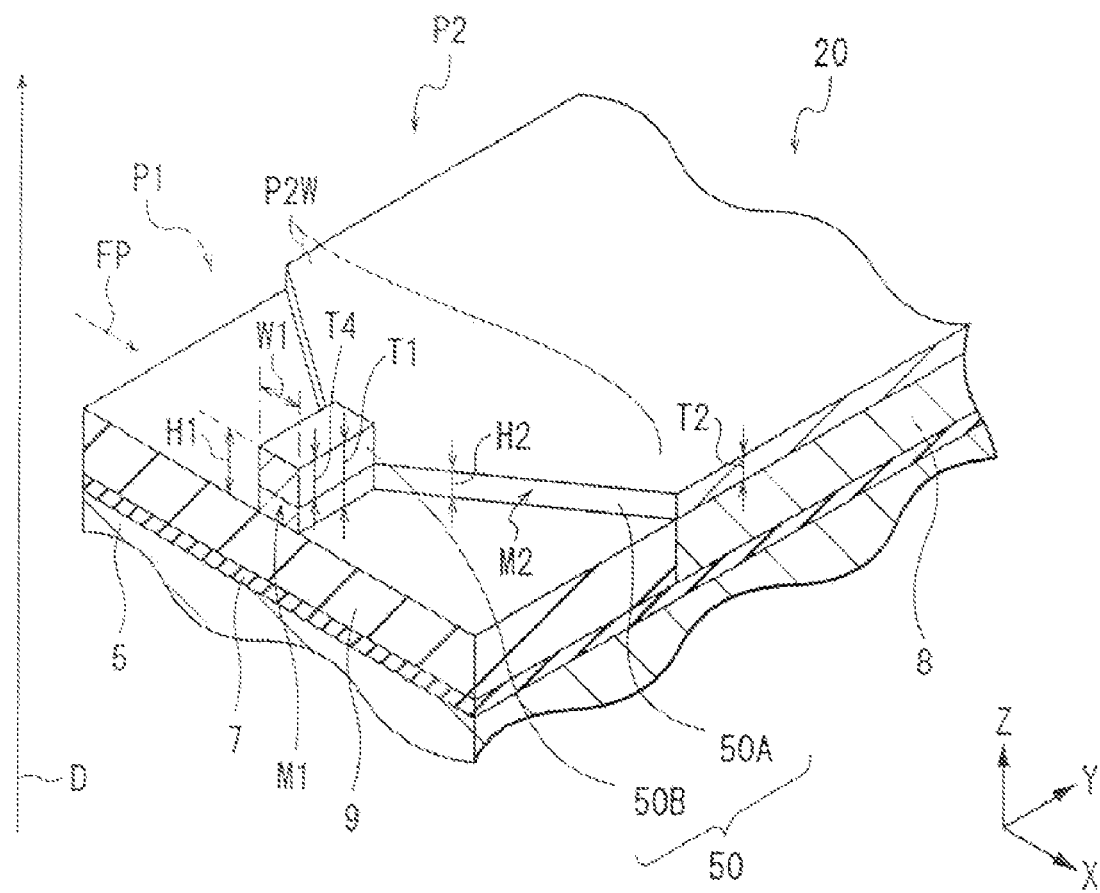
FIG. 13 is a perspective view showing the configuration of a main portion of the thin film magnetic head illustrated in FIGS. 12A and 12B.

In the embodiment, as shown in FIGS. 1A and 1B to FIG. 3, the main magnetic pole layer 10 including the uniform width portion P1 and the wide portion P2 is constructed by two different components; the lower main magnetic pole layer 10A extending rearward from the flare point FP, and the upper main magnetic pole layer 10B extending from the air bearing surface 40 through the flare point FP onto the lower main magnetic pole layer 10A. The invention is not limited to the configuration. As long as the height H2 of the widened end surface M2 is smaller than the height H1 of the exposed surface M1, the configuration of the main magnetic pole layer 10 can be freely changed. Concretely, for example, as shown in FIGS. 12A and 12B and FIG. 13, a main magnetic pole layer 50 including the uniform width portion P1 and the wide portion P2 may be constructed by two different components; a lower main magnetic pole layer 50A and an upper main magnetic pole layer 50B. The lower main magnetic pole layer 50A extends rearward from the air bearing surface 40 through the flare point FP, has the uniform thickness T2 as a whole, and has a planar shape obtained by combining the planar shape of the lower main magnetic pole layer 10A and the planar shape of the front end portion 10B1 in the upper main magnetic pole layer 10B described in the foregoing embodiment. The upper main magnetic pole layer 50B is disposed on the lower main magnetic pole layer 50A, extends from the air bearing surface 40 to the flare point FP, has thickness T4 (T1-T2), and has a planar shape similar to that of the front end portion 10B1 described in the foregoing embodiment. The main magnetic pole layer 50 can be formed by, for example, pattern-forming the lower main magnetic pole layer 50A by using the plating process and pattern-forming the upper main magnetic pole layer 50B on the lower main magnetic pole layer 50A by subsequently using the plating process. In this case as well, unintentional emission of the magnetic flux from the widened end surface M2 in the lower main magnetic pole layer 50A to a recording medium is suppressed. Consequently, unintentional writing to a neighboring track can be sufficiently suppressed and information recorded on a recording medium can be prevented. Characteristics other than the characteristics regarding the configuration of the thin film magnetic head shown in FIGS. 12A and 12B and FIG. 13 are similar to those in the case shown in FIGS. 1A and 1B and FIG. 3.

Figure 14:
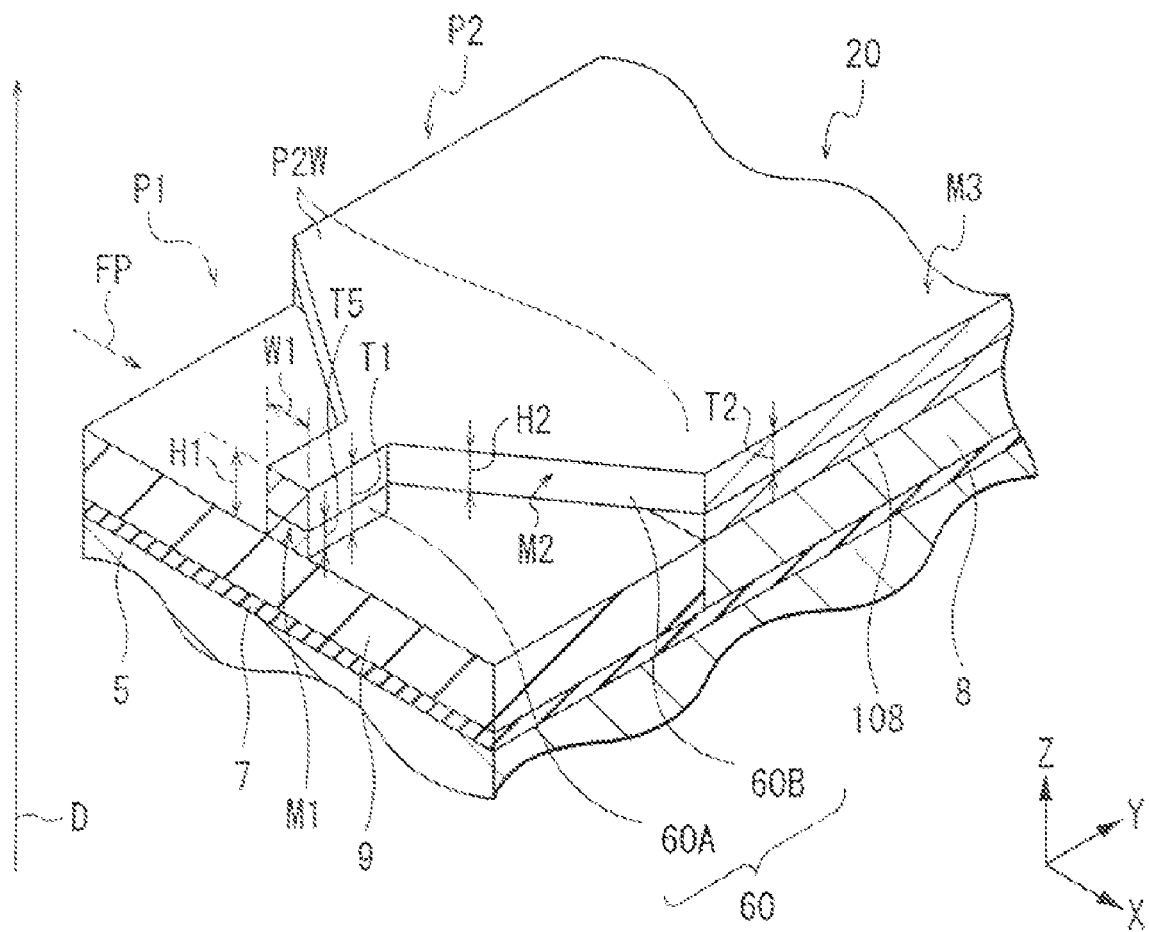
FIG. 14 is a perspective view showing further another modification of the configuration of the thin film magnetic head according to the embodiment of the invention.

In this case, for example, as shown in FIG. 14, a main magnetic pole layer 60 including the uniform width portion P1 and the wide portion P2 may be constructed by two different components; a lower main magnetic pole layer 60A and an upper main magnetic pole layer 60B. The lower main magnetic pole layer 60A extends from the air bearing surface 40 to the flare point FP, has thickness T5 (T1-T2), and has a planar shape similar to that of the front end portion 10B1 described in the foregoing embodiment. The upper main magnetic pole layer 60B is disposed on the lower main magnetic pole layer 60A, extends from the air bearing surface 40 via the flare point FP to the rear side, has the uniform thickness T2 as a whole, and has a planar shape obtained by combining the planar shape of the lower main magnetic pole layer 10A and the planar shape of the front end portion 10B1 described in the foregoing embodiment. The main magnetic pole layer 60 can be formed by, for example, pattern-forming the lower main magnetic pole layer 60A by using the plating process and pattern-forming the upper main magnetic pole layer 60B on the lower main magnetic pole layer 60A by subsequently using the plating process. In the case of forming the main magnetic pole layer 60, for example, to assure magnetic coupling between the main magnetic pole layer 60 and the auxiliary magnetic pole layer 8, it is preferable to form an additional auxiliary magnetic pole layer 108 in a region corresponding to the auxiliary magnetic pole layer 8 simultaneously with formation of the lower main magnetic pole layer 60A and, after that, to form the upper main magnetic pole layer 60B on the lower main magnetic pole layer 60A and the additional auxiliary magnetic pole layer 108. In this case as well, unintentional emission of the magnetic flux from the widened end surface M2 in the upper main magnetic pole layer 60B to a recording medium is suppressed. Consequently, unintentional writing to a neighboring track can be sufficiently suppressed and information recorded on a recording medium can be prevented. In this case, particularly, different from the configuration shown in FIG. 3 in the foregoing embodiment and the configuration shown in FIG. 13 as a modification, specifically, the wide portion P2 is disposed on the leading side of the uniform width portion P1 in the height direction (Z-axis direction in the diagram), the wide portion P2 is disposed on the trailing side of the uniform width portion P1. Therefore, the magnetic flux is more easily concentrated on the trailing edge TE as the substantial recording portion, so that the recording magnetic field intensity can be increased. Characteristics other than the characteristics regarding the configuration of the thin film magnetic head shown in FIG. 14 are similar to those in the case shown in FIG. 3.

The thin film magnetic head according to the embodiment of the invention has been described above.

Figure 15:
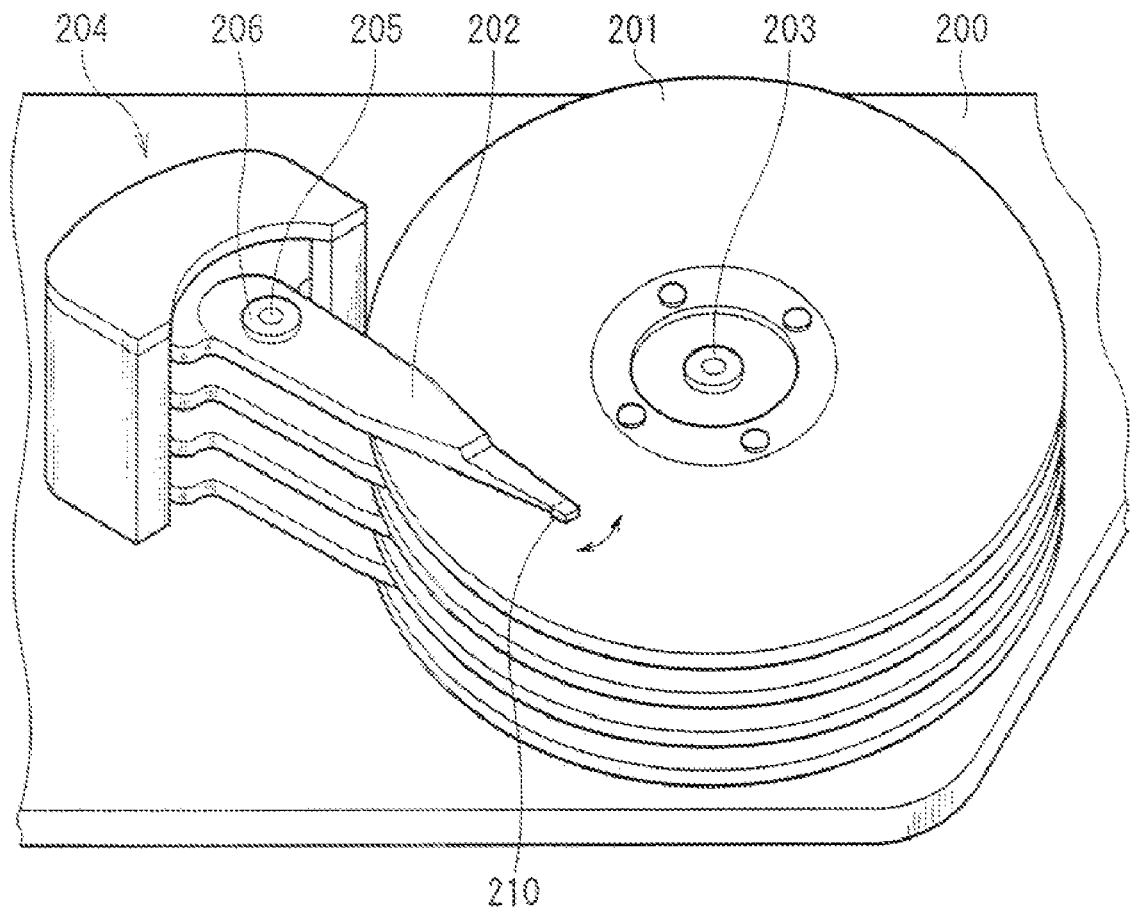
FIG. 15 is a perspective view showing a cutaway appearance configuration of the magnetic recording apparatus in which the thin film magnetic head of the invention is mounted.
Figure 16:
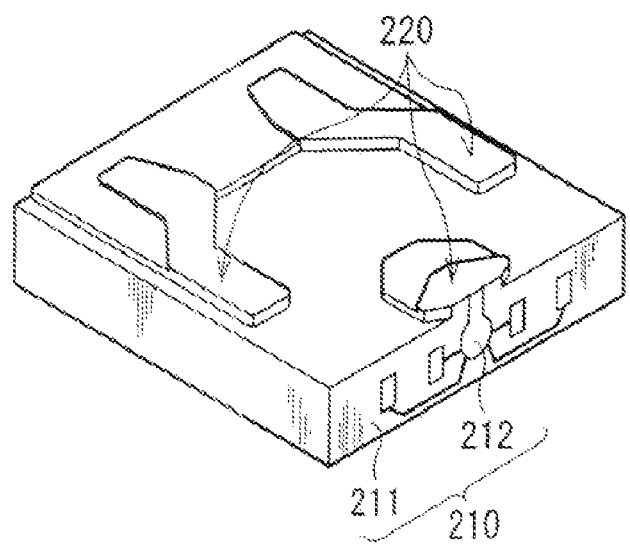
FIG. 16 is an enlarged perspective view of the appearance configuration of the main portion of the magnetic recording apparatus shown FIG. 15.

Next, with reference to FIGS. 15 and 16, the configuration of a magnetic recording apparatus on which the thin film magnetic head of the invention is mounted will be described. FIG. 15 shows a cutaway configuration of the magnetic recording apparatus. FIG. 16 shows an enlarged configuration of a main portion of the magnetic recording apparatus. The magnetic recording apparatus is an apparatus in which the thin film magnetic head described in the foregoing embodiment is mounted and is, for example, a hard disk drive.

The magnetic recording apparatus has, as shown in FIG. 15, for example, in a casing 200, a plurality of magnetic disks 201 (for example, hard disks) as recording media on which information is recorded and a plurality of arms 202 disposed in correspondence with the magnetic disks 201 in a one-to-one manner, each having a tip to which a head slider 210 is attached. The magnetic disk 201 is rotatable around a spindle motor 203 fixed to the casing 200 as a center. The arms 202 are connected to a driving unit 204 as a power source and are swingable via a bearing 206 around a fixed axis 205 fixed to the casing 200 as a center. The driving unit 204 includes, for example, a driving source such as a voice coil motor. FIG. 15 shows a model in which the plurality of arms 202 integrally swing around the fixed axis 205 as a center.

The head slider 210 has a configuration such that, as shown in FIG. 16, a thin film magnetic head 212 of the perpendicular recording method is attached to one side face orthogonal to an air bearing surface 220 (front side in FIG. 16), in a base body 211 having an almost rectangular parallelepiped shape including a rough surface (air bearing surface 220) for decreasing air resistance which occurs when the arm 202 swings. The thin film magnetic head 212 has, for example, the configuration described in the foregoing embodiment. FIG. 16 shows the upside down state of FIG. 15 so that the structure on the air bearing surface 220 side of the head slider 210 can be seen well.

In the magnetic recording apparatus, at the time of recording information, by swing of the arm 202, the head slider 210 moves to a predetermined region (recording region) in the magnetic disk 201. When current is passed to the thin film magnetic head 212 in a state where the thin film magnetic head 212 faces the magnetic disk 201, by the operation described in the foregoing embodiment, the thin film magnetic head 212 records information onto the magnetic disk 201.

In the magnetic recording apparatus, the thin film magnetic head 212 of the invention is provided, so that unintentional writing to a neighboring track by the thin film magnetic head 212 is suppressed and information recorded on the magnetic disk 201 can be prevented from being erased.

The other configuration, operation, action, effect, modification, and the like of the thin film magnetic head 212 mounted on the magnetic recording apparatus are similar to those of the foregoing embodiments, so that their description will not be repeated.

EXAMPLE

An example of the invention will now be described. Characteristics in the case where the thin film magnetic head of the invention shown in FIGS. 1A and 1B to FIG. 3 is mounted on the magnetic recording apparatus shown in FIGS. 15 and 16 and the recording process is performed in the embodiment were examined and the following results were obtained. The characteristics of the thin film magnetic head of the invention were examined on conditions that a flare distance (distance between the air bearing surface 40 and the flare point FP) is 0.3 μm, flare angle (angle between the extending direction of the front end portion 10B1 (Y-axis direction) and the widened end surface M2) is 70°, each of the width W1 and the thickness T1 of the front end portion 10B1 is 0.2 μm, and magnetomotive force of the thin film coil 14 is 150 mAT.

Figure 17:
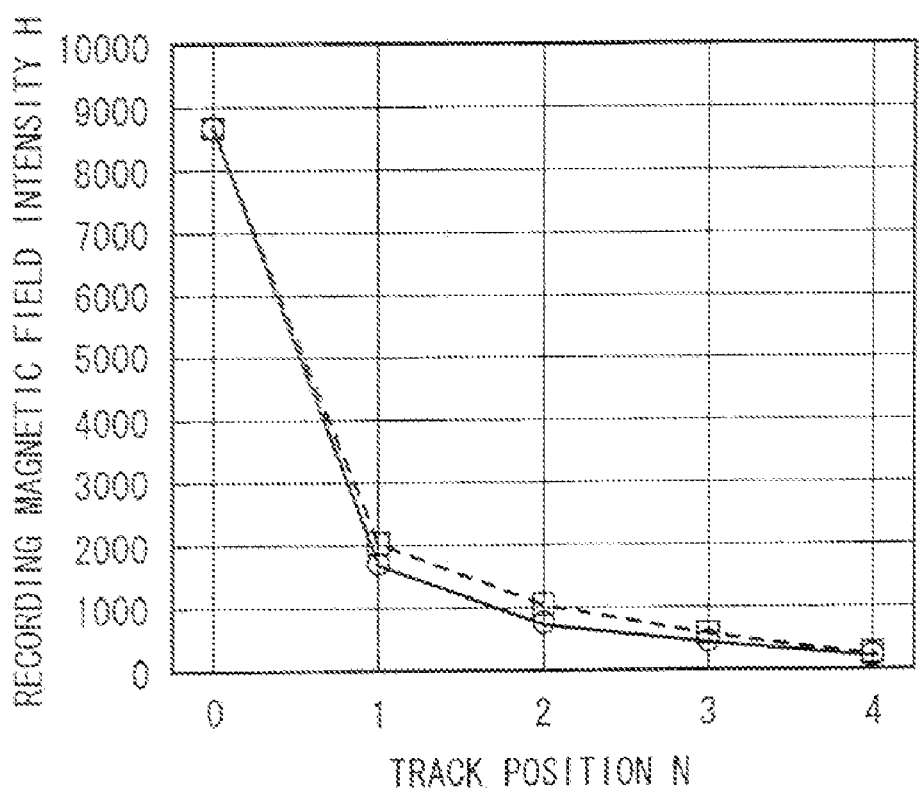
FIG. 17 is a diagram showing the correlation between a track position and recording magnetic field intensity.

First, when the thickness ratio T2/T1 was fixed to 0.5 and the unintentional writing state to a neighboring track was examined, the result shown in FIG. 17 was obtained. FIG. 17 shows the correlation between track position on a recording medium and recording magnetic field intensity. The "horizontal axis" denotes a recording position N, that is, a track position (N is 1 to 4) apart from a track to be recorded only by N tracks. The "vertical axis" denotes recording magnetic field intensity H received by the recording medium in each track position ($\times 10^3/(4\pi)$A/m=Oe). At the time of examining the writing state of the thin film magnetic head of the invention, to evaluate the performance by comparison, a writing state was examined similarly with respect to the thin film magnetic head of the comparative example shown in FIG. 10 in the embodiment. "○" shown in FIG. 17 indicates the result of the thin film magnetic head of the invention and "□" indicates the result of the thin film magnetic head of the comparative example.

As understood from the result shown in FIG. 17, the recording magnetic field intensity received by the recording medium noticeably decreases as the track position N increases, that is, as the distance from the track to be recorded (N is 0) increases in both of the cases of the invention (○) and the comparative example (□). When the thin film magnetic head of the invention and the thin film magnetic head of the comparative example are compared with each other, the recording magnetic field intensity H in each track position N in the thin film magnetic head of the invention is lower than that in the thin film magnetic head of the comparative example. In particular, the recording magnetic field intensity H in a neighboring track position (N is 1) in which the recording magnetic field intensity H is relatively high and information written due to unintentional writing to a neighboring track is most easily erased in the thin film magnetic head of the invention is lower than that of the thin film magnetic head of the comparative example by about $200\times10^3/(4\pi)$A/m. Therefore, it was recognized that, in the thin film magnetic head of the invention, unintentional writing to a neighboring track is suppressed by decreasing the recording magnetic field intensity received by a recording medium in the neighboring track, and information recorded on the recording medium can be prevented from being erased.

Figure 18:
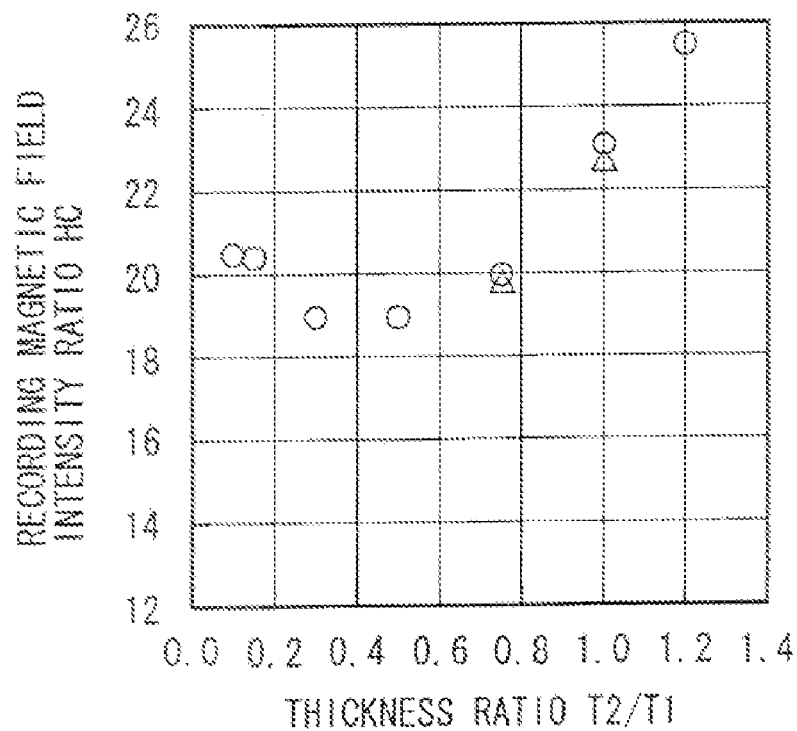
FIG. 18 is a diagram showing the correlation between a thickness ratio and a recording magnetic field intensity ratio.

Subsequently, dependency of the recording magnetic field intensity ratio on the thickness ratio T2/T1 was examined and the result shown in FIG. 18 was obtained. FIG. 18 shows the correlation between the thickness ratio T2/T1 and the recording magnetic field intensity ratio. The "horizontal axis" indicates the thickness ratio T2/T1, and the "vertical axis" indicates the recording magnetic field intensity ratio HC, specifically, the ratio H2/H1×100(%) of the recording magnetic field intensity H2 in a neighboring track to the recording magnetic field intensity H1 in a track to be recorded. "○" shown in FIG. 18 indicates the result in the case where the saturated magnetic flux density J1 of the upper main magnetic pole layer 10B=the saturated magnetic flux density J2 of the lower main magnetic pole layer 10A=2.3 T (tesla) (J1=J2). "Δ" shows the result in the case where the saturated magnetic flux density J1 of the upper main magnetic pole layer 10B=2.3T and the saturated magnetic flux density J2 of the lower main magnetic pole layer 10A=1.8 (J1>J2).

As understood from the result shown in FIG. 18, the recording magnetic field intensity ratio HC changes in a curve which opens upward as the thickness ratio T2/T1 increases. In particular, in both of the case where J1=J2 (○) and the case where J1>J2 (Δ), the recording magnetic field intensity ratio HC becomes 24% or less in the range where the thickness ratio T2/T1 is less than 1.0, and the recording magnetic field intensity ratio HC is sufficiently low.

Figure 19:
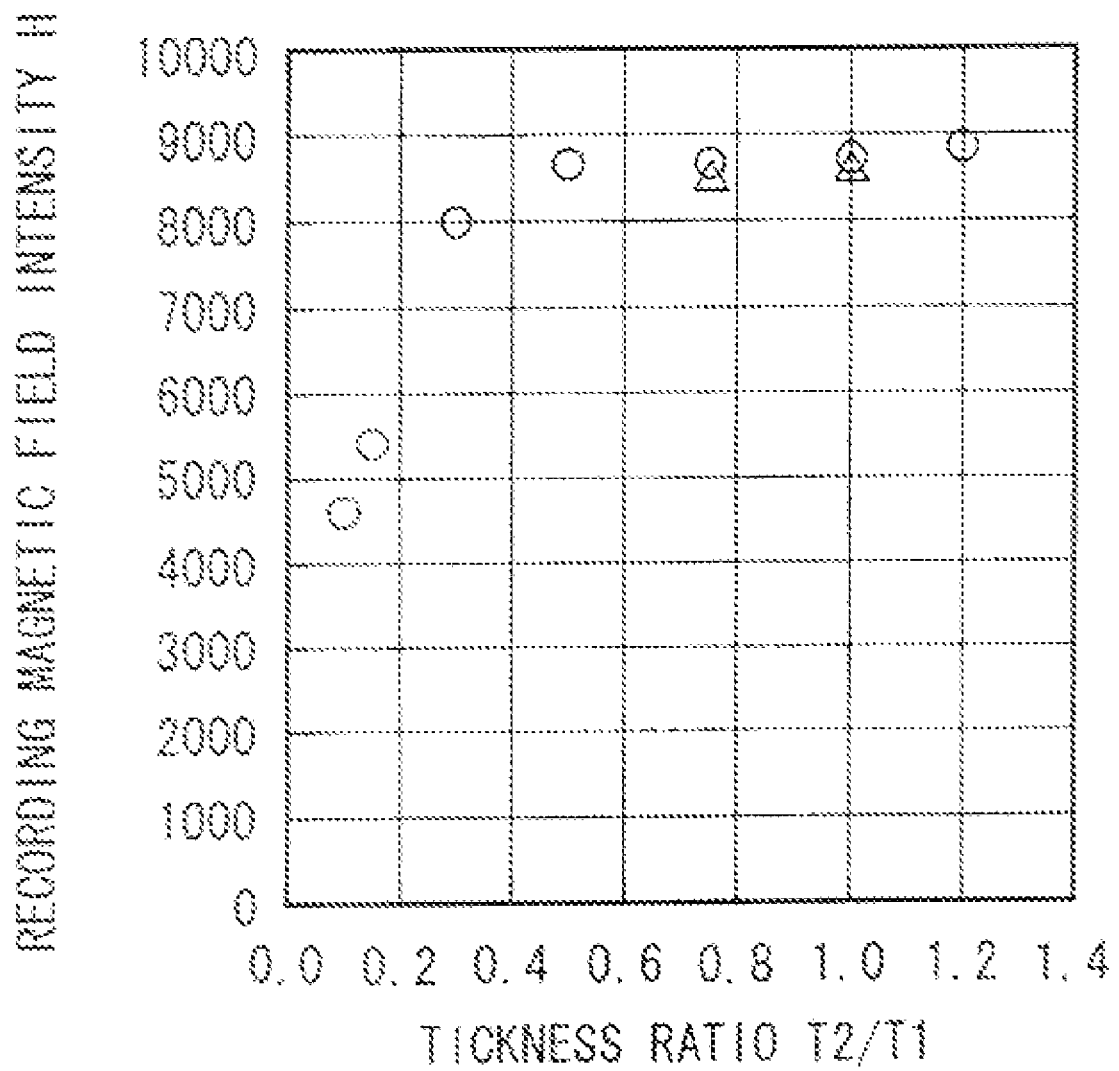
FIG. 19 is a diagram showing the correlation between a thickness ratio and a recording magnetic field intensity.

Subsequently, dependency on the recording magnetic field intensity of the thickness ratio T2/T1 was examined and the result shown in FIG. 19 was obtained. FIG. 19 shows the correlation between the thickness ratio T2/T1 and the recording magnetic field intensity. The "horizontal axis" shows the thickness ratio T2/T1 and the "vertical axis" indicates the recording magnetic field intensity H ($\times10^3/(4\pi)$A/m=Oe) received by a recording medium in the track to be recorded. "○" and "Δ" shown in FIG. 19 indicate the results similar to those in FIG. 18.

As understood from the result shown in FIG. 19, the recording magnetic field intensity H received by a recording medium in a track to be recorded gradually increases as the thickness ratio T2/T1 increases. In both of the case where J1=J2 (○) and the case where J1>J2 (Δ), the recording magnetic field intensity H is $8000\times10^3/(4\pi)$A/m or higher in the range where the thickness ratio T2/T1 is 0.3 or higher, and the recording magnetic field intensity H is sufficiently high.

When the results obtained in FIGS. 18 and 19 are brought together, by setting the thickness ratio T2/T1 to 0.3≦T2/T1<1.0, it was confirmed that, while assuring sufficient recording magnetic field intensity in a track to be recorded, unnecessary magnetic field intensity can be suppressed in a neighboring track, that is, erasure of information due to unintentional writing to a neighboring track can be prevented. It was confirmed that, by setting the thickness ratio T2/T1 to 0.3≦T2/T1≦0.75 and, further, to 0.3≦T2/T1≦0.5, erasure of information due to unintentional writing to a neighboring track can be effectively prevented.

Although the invention has been described above by the embodiment, the invention is not limited to the embodiment but can be variously modified. Concretely, for example, although the case of applying the invention to a shielded head has been described in the foregoing embodiment, the invention is not always limited to the case but may be applied to a single magnetic pole type head. Although the case of applying the invention to a composite thin film magnetic head has been described in the foregoing embodiment, the invention is not always limited to the case but can be also applied to a thin film magnetic head dedicated to recording having an inductive magnetic transducer for writing and a thin film magnetic head having an inductive magnetic transducer for recording and reproducing. Obviously, the invention can be also applied to a thin film magnetic head of a structure in which the order of stacking an element for writing and an element for reading is reversed.

Although the case of applying the invention to the thin film magnetic head of the perpendicular recording method has been described in the embodiment, the invention is not always limited to the case but can be also applied to a thin film magnetic head of a longitudinal recording method.

The thin film magnetic head according to the invention, the method of manufacturing the same, and the magnetic recording apparatus having the thin film magnetic head can be applied to a hard disk drive for magnetically recording information onto a hard disk and the like.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head comprising:
    a thin film coil for generating a magnetic flux; and
    a magnetic pole layer which extends rearward from a recording-medium-facing surface facing a recording medium traveling in a medium travel direction and emits the magnetic flux generated by the thin film coil toward the recording medium,
    wherein the magnetic pole layer includes: a uniform width portion having uniform width that specifies recording track width of the recording medium, extending from the recording-medium-facing surface, and including an exposed surface exposed on the recording-medium-facing surface; and a wide portion coupled to the rear end of the uniform width portion, extending with width larger than the uniform width, and including widened end surfaces along the increased width, and
    height H2 of the widened end surface in the wide portion is smaller than height H1 of the exposed surface in the uniform width portion (H2<H1), wherein the wide portion includes wing portions positioned on both sides of the uniform width portion, and thickness T2 of the wing portions is smaller than thickness T1 of the uniform width portion at least on the side close to the widened end surfaces (T2<T1).

2. A thin film magnetic head according to claim 1, wherein a ratio T2/T1 of the thickness T2 of the wing portions to the thickness T1 of the uniform width portion is in a range from 0.3 to less than 1.0.

3. A thin film magnetic head comprising:

a thin film coil for generating a magnetic flux; and a magnetic pole layer which extends rearward from a recording-medium-facing surface facing a recording medium traveling in a medium travel direction and emits the magnetic flux generated by the thin film coil toward the recording medium, wherein the magnetic pole layer includes: a uniform width portion having uniform width that specifies recording track width of the recording medium, extending from the recording-medium-facing surface, and including an exposed surface exposed on the recording-medium-facing surface; and a wide portion coupled to the rear end of the uniform width portion, extending with width larger than the uniform width, and including widened end surfaces along the increased width, and height H2 of the widened end surface in the wide portion is smaller than height H1 of the exposed surface in the uniform width portion (H2<H1), wherein the magnetic pole layer includes: a first magnetic pole layer portion extending rearward from a width increase position from which the width of the magnetic pole layer increases from the uniform width portion to the wide portion and having width corresponding to the wide portion; and a second magnetic pole layer portion extending rearward from the recording-medium-facing surface via the width increase position onto the first magnetic pole layer portion, having width corresponding to the width of the uniform width portion in a portion at least on the front side of the width increase position, and whose end surface on the side in the medium travel direction is flat as a whole, the wide portion corresponds to the first magnetic pole layer portion, and the uniform width portion corresponds to the second magnetic pole layer portion.

4. A thin film magnetic head according to claim 3, wherein saturated magnetic flux density J1 of the second magnetic pole layer portion is equal to or higher than saturated magnetic flux density J2 of the first magnetic pole layer portion (J1≧J2).

* * * * *

UNITED STATES PATENT AND TRADEMARK OFFICE
CERTIFICATE OF CORRECTION

| | | |
|---|---|---|
| PATENT NO. | : 7,583,472 B2 | Page 1 of 1 |
| APPLICATION NO. | : 10/926895 | |
| DATED | : September 1, 2009 | |
| INVENTOR(S) | : Naoto Matono | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this

Fourteenth Day of September, 2010

David J. Kappos
*Director of the United States Patent and Trademark Office*